(12) United States Patent
Bilkadi

(10) Patent No.: US 6,358,601 B1
(45) Date of Patent: *Mar. 19, 2002

(54) ANTISTATIC CERAMER HARDCOAT COMPOSITION WITH IMPROVED ANTISTATIC CHARACTERISTICS

(75) Inventor: Zayn Bilkadi, Mahtomedi, MN (US)

(73) Assignee: 3M Innovative Properties Company, St. Paul, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/891,564

(22) Filed: Jul. 11, 1997

(51) Int. Cl.$^7$ ................................................ B32B 5/16
(52) U.S. Cl. .................... 428/323; 428/331; 428/411.1; 428/446; 428/447; 428/500; 428/515; 428/688; 428/689; 428/702; 523/212
(58) Field of Search .......................... 523/212; 428/323, 428/331, 411.1, 446, 447, 500, 515, 686, 689, 702

(56) References Cited

U.S. PATENT DOCUMENTS

| | | | |
|---|---|---|---|
| 3,787,467 A | 1/1974 | Lucking et al. | 556/422 |
| 4,251,576 A * | 2/1981 | Osborn et al. | 428/331 |
| 4,618,518 A * | 10/1986 | Pricone et al. | 428/41.5 |
| 5,176,943 A | 1/1993 | Woo | 428/64.4 |
| 5,210,248 A | 5/1993 | Babirad et al. | 556/420 |
| 5,391,210 A | 2/1995 | Bilkadi et al. | 51/238 |
| 5,541,049 A | 7/1996 | Ballerini et al. | 430/527 |
| 5,608,003 A | 3/1997 | Zhu | 524/516 |
| 5,677,050 A * | 10/1997 | Bilkradi et al. | 428/331 |

FOREIGN PATENT DOCUMENTS

| | | |
|---|---|---|
| EP | 0 628 610 A1 | 12/1994 |
| EP | 0 675 087 A1 | 10/1995 |
| WO | WO 96/21700 | 7/1996 |
| WO | WO 96/36669 | 11/1996 |
| WO | WO 97/00917 | 1/1997 |
| WO | WO 97/01599 | 1/1997 |

* cited by examiner

*Primary Examiner*—Leszek Kiliman
(74) *Attorney, Agent, or Firm*—Scott R. Pribnow

(57) ABSTRACT

The present invention relates to an approach for improving the compatibility of antistatic agents and ceramer hardcoats so that such hardcoats can be provided with excellent antistatic characteristics. In particular, it has been discovered that the antistatic agents of this invention can be combined with aqueous sols of surface treated, colloidal inorganic oxide particles having a negative surface charge without destabilizing the negatively charged colloids. It has further been discovered that the combination of the antistatic agent and negatively charged, surface treated colloids of this invention interspersed in a cured ceramer matrix unexpectedly provides dramatic improvements in antistatic protection. The antistatic approach of this invention also provides excellent antistatic protection over a wide range of relative humidity, including conditions in which RH is below 40%, especially at 15% to 40% RH.

33 Claims, No Drawings

ANTISTATIC CERAMER HARDCOAT COMPOSITION WITH IMPROVED ANTISTATIC CHARACTERISTICS

FIELD OF THE INVENTION

This invention relates to an antistatic protective coating and method for making the same. More particularly, the invention relates to an antistatic protective coating incorporating negatively charged inorganic oxide particles, a salt of a perfluorinated anion, and a surfactant.

BACKGROUND OF THE INVENTION

Thermoplastic and thermosetting polymers are used to form a wide variety of structures for which optical clarity, i.e., good light transmittance, is a desired characteristic. Examples of such structures include camera lenses, eyeglass lenses, binocular lenses, retroreflective sheeting, automobile windows, building windows, train windows, boat windows, aircraft windows, vehicle headlamps and taillights, display cases, eyeglasses, watercraft hulls, road pavement markings, overhead projectors, stereo cabinet doors, stereo covers, furniture, bus station plastic, television screens, computer screens, watch covers, instrument gauge covers, optical and magneto-optical recording disks, and the like. Examples of polymer materials used to form these structures include thermosetting or thermoplastic polycarbonate, poly(meth) acrylate, polyurethane, polyester, polyamide, polyimide, phenoxy, phenolic resin, cellulosic resin, polystyrene, styrene copolymer, epoxy, and the like.

Many of these thermoplastic and thermosetting polymers have excellent rigidity, dimensional stability, transparency, and impact resistance, but unfortunately have poor abrasion resistance. Consequently, structures formed from these materials are susceptible to scratches, abrasion, and similar damage.

To protect these structures from physical damage, a tough, abrasion resistant "hardcoat" layer may be coated onto the structure. Many previously known hardcoat layers have been formed from radiation curable prepolymers such as (meth)acrylate functional monomers. Such hardcoat compositions have been described, for example, in Japanese patent publication JP02-260145, U.S. Pat. No. 5,541,049, and U.S. Pat. No. 5,176,943. One particularly excellent hardcoat composition is described in WO 96/36669 A1. This publication describes a hardcoat formed from a "ceramer" used, in one application, to protect the surfaces of retroreflective sheeting from abrasion. As defined in this publication, a ceramer is a composite (preferably transparent) having inorganic oxide particles, e.g., silica, of nanometer dimensions dispersed in a crosslinkable mixture.

Thermoplastic polymers and thermosetting polymers, as well as hardcoats formed from such polymers, are poor electrical conductors. As a consequence, static charge can build-up on structures and coatings formed from these materials. Static charge attracts dust, which impairs optical clarity and appearance. Even the ceramer hardcoat compositions of WO 96/36669 A1 are susceptible to static charge build up. It has been desirable, therefore, to use antistatic agents to help prevent and/or dissipate static charges.

There are two common approaches for using antistatic agents with a hardcoat. One approach involves coating an antistatic agent directly onto the hardcoat layer. This approach, however, generally does not provide long-lasting antistatic protection in that such coatings tend to be easy to wipe or wear away. Another approach involves pre-mixing antistatic agents with the uncured hardcoat composition before the hardcoat is coated onto its substrate and cured. Generally, effective antistatic agents incorporated into hardcoat compositions have included one or more components in which at least one of the components is ionic. For example, U.S. Pat. No. 5,176,943 describes an antistatic agent including a combination of ionic and nonionic perfluorinated compounds.

Unfortunately, ceramers tend to be incompatible with many ionic compounds, including ionic antistatic compounds. The incompatibility arises from the preferred way in which ceramers are formed. Many ceramers are derived from aqueous sols of inorganic colloids in which the colloids are extremely charge sensitive. Adding ionic ingredients to such sols tends to destabilize the colloids, causing the colloids to flocculate and precipitate out of the dispersion. Flocculation is not conducive to forming high quality antistatic coatings. Firstly, flocculation results in local accumulations of particles, and these accumulations are large enough to scatter light. This detracts from optical clarity. Additionally, the accumulations of particles may cause nibs and/or other defects in the resultant coatings. Abrasion resistance may also be impaired. It would be desirable, therefore, to provide an approach in which antistatic agents could be incorporated into ceramer hardcoat compositions without causing the inorganic colloids to flocculate.

Relative humidity (RH) can affect the performance of antistatic coatings. For example, some antistatic systems might perform adequately at relatively high relative humidity, e.g. RH$\geq$40%, yet perform dismally at relatively low relative humidity, e.g., RH<40%. Accordingly, there is also a need for antistatic systems that retain antistatic properties over wider ranges of relative humidity, particularly for conditions below 40% RH.

SUMMARY OF THE INVENTION

The present invention relates to an approach for improving the compatibility of antistatic agents and ceramer hardcoats so that such hardcoats can be provided with excellent antistatic characteristics. In particular, it has been discovered that the antistatic agents of this invention can be combined with aqueous sols of surface treated, colloidal inorganic oxide particles having a negative surface charge without destabilizing the negatively charged colloids. It has further been discovered that the combination of the antistatic agent and negatively charged, surface treated colloids of this invention interspersed in a cured ceramer matrix unexpectedly provides dramatic improvements in antistatic protection. The antistatic approach of this invention also provides excellent antistatic protection over a wide range of relative humidity, including conditions in which RH is below 40%, especially at 15% to 40% RH, preferably 20% to 40% RH.

In one aspect, the present invention relates to a cured, anti-static ceramer coating, comprising:
   (a) a polymeric matrix;
   (b) a plurality of surface treated, colloidal, inorganic oxide particles interspersed in the polymeric matrix, wherein the colloidal inorganic oxide particles have a negative surface charge;
   (c) an antistatic amount of an antistatic agent dispersed in the polymeric matrix, wherein the antistatic agent comprises a perfluorinated anion having at least one perfluorinated moiety; and
   (d) an amount of a nonionic surfactant effective to bias the perfluorinated moiety to migrate to a surface of the polymeric matrix.

In another aspect, the present invention relates to a substrate bearing an antistatic ceramer coating of the type described above.

In another aspect, the present invention relates to a coatable, radiation curable, antistatic, ceramer composition comprising:

(a) a curable binder component which is preferably a plurality of copolymerizable, free radically curable monomers and/or one or more silane monomers;

(b) a plurality of surface treated, colloidal, inorganic oxide particles having a negative surface charge;

(c) an antistatic amount of an antistatic agent, wherein the antistatic agent comprises a salt of a perfluorinated anion having at least one perfluorinated moiety; and (d) an amount of a nonionic surfactant effective to bias the perfluorinated moiety to migrate to a surface of the composition.

In another aspect, the present invention relates to a method of providing a polymeric substrate with a protective, cured, antistatic ceramer coating comprising the steps of:

(a) coating an admixture onto the polymeric substrate, wherein the admixture is a coatable ceramer composition comprising a plurality of surface treated, colloidal, inorganic oxide particles having a negative surface charge, a curable binder component which is preferably a plurality of copolymerizable, free radically curable monomers and/or one or more silane monomers, an antistatic amount of a perfluorinated anion having at least one perfluorinated moiety, and an amount of a nonionic surfactant effective to bias the perfluorinated moiety to migrate to a surface of the admixture; and (b) curing the curable binder component.

As used herein with respect to the present invention, the following shall apply:

"Sol" shall refer to a colloidal dispersion of substantially non-aggregated, inorganic oxide particles in a liquid medium;

"Ceramer composition" shall refer to a coatable dispersion comprising substantially non-aggregated, colloidal inorganic oxide particles dispersed in a curable binder composition, wherein curing of the binder is understood to mean in a broad sense the process of solidification (hardening) of the binder brought about by a suitable approach such as cooling of a molten thermoplastic material, drying of a solvent-containing composition, chemical crosslinking of a thermosetting composition, radiation curing of a radiation curable composition, or the like;

"Ceramer coating" shall refer to a coating of a ceramer composition in which the curable composition is cured to form a solid, substantially non-flowing material; and "Curable" shall mean that a coatable material can be transformed into a solid, substantially non-flowing material by means of cooling (to solidity hot melts), heating (to dry and solidify materials in a solvent), chemical crosslinking, radiation crosslinking, or the like.

DETAILED DESCRIPTION OF THE PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

One preferred antistatic ceramer coating embodiment of the present invention is prepared from a ceramer composition comprising a curable binder component; a plurality of inorganic oxide particles; an antistatic agent which is a salt of a perfluorinated anion; and a nonionic surfactant, each of which will be described in more detail below. A wide range of amounts of these materials may be incorporated into the composition with beneficial results. As one example of a formulation suitable for forming tough, abrasion resistant, impact resistant, optically clear, antistatic, protective, ceramer coatings, the ceramer composition may include about 100 parts by weight of the curable binder component, about 10 to 50 parts by weight of the surface treated inorganic oxide particles, about 0.1 to about 10 parts by weight of the antistatic agent, and about 0.1 to about 10 parts by weight of the nonionic surfactant. More preferably, the composition includes about 100 parts by weight of the curable binder component, about 25 to 40 parts by weight of the surface treated inorganic oxide particles, about 0.5 to about 5 parts by weight of the antistatic agent, and about 0.5 to about 5 parts by weight of the nonionic surfactant.

As one option, the curable binder component can be selected from any curable thermoplastic or thermosetting polymer such as a polyurethane, polycarbonate, polyester, polyamide, polyimide, phenoxy, phenolic resin, cellulosic resin, polystyrene, styrene copolymer, poly(meth)acrylate, epoxy, silicone resin, combination of these, and the like. As another option, the curable binder component can be in the form of prepolymeric materials which can be copolymerized or homopolymerized in situ after the composition has been coated onto a substrate.

As one example of an approach using prepolymeric materials, the curable binder component may comprise one or more partially hydrolyzed organofunctional silane monomers. Such partially hydrolyzed organofunctional silane monomers generally are capable of crosslinking upon drying and heating to form a polymeric siloxane-type matrix.

A wide variety of organofunctional silane monomers may be used in the practice of the present invention. Representative examples include methyl trimethoxysilane, methyl triethoxysilane, phenyl trimethoxysilane, phenyl triethoxysilane, a silyl (meth)acrylate, (meth)acryloxyalkyl trimethoxysilane, (meth)acryloxyalkyl trichlorosilane, phenyl trichlorosilane, vinyl trimethoxysilane, vinyl triethoxysilane, propyl trimethoxysilane, propyl triethoxysilane, glycidoxyalkyl trimethoxysilane, glycidoxyalkyl triethoxysilane, glycidoxyalkyl trichlorosilane, perfluoro alkyl trialkoxysilane, perfluoromethyl alkyl trialkoxysilane, perfluoroalkyl trichlorosilane, combinations of these, and the like. In those embodiments of the invention in which the inorganic oxide particles are surface treated with a silane coupling agent (as will be described below), such coupling agent may be the same or different from the silane monomers used to form the polymeric matrix.

As another example of an approach using prepolymeric materials, the curable binder component comprises one or more free radically curable monomers, oligomers, polymers, or combinations of these having pendant free radically curable functionality which allows the materials to polymerize and/or crosslink using thermal energy or another source of curing radiation such as electron beam radiation, ultraviolet radiation, visible light, and the like. Preferred free radically curable monomers, oligomers, and/or polymers each include one or more free-radically polymerizable, carbon-carbon double bonds such that the average functionality of such materials is greater than one free-radically carbon-carbon double bond per molecule. Materials having such moieties are capable of copolymerization and/or crosslinking with each other via such carbon-carbon double bond functionality.

Generally, the term "monomer" as used herein refers to a single, one unit molecule capable of combination with itself or other monomers to form oligomers or polymers. The term "oligomer" refers to a compound that is a combination of 2 to 20 monomers. The term "polymer" refers to a compound that is a combination of 21 or more monomers.

Generally, compositions including oligomeric and/or polymeric free radically curable materials tend to have higher viscosities than compositions including only free radically curable monomers. Accordingly, in applications involving techniques such as spin coating or the like in which it is desirable for the composition to have a low viscosity, e.g., a viscosity of less than 200 centipoise measured at 25° C. using a Brookfield viscometer with any suitable spindle operated at a spindle speed in the range from 20 to 50 rpm, it is preferred that at least 50%, by weight, more preferably substantially all, of the prepolymers are free radically curable monomers.

Free radically curable monomers suitable in the practice of the present invention are preferably selected from combinations of mono, di, tri, tetra, penta, and hexafunctional free radically curable monomers. Various amounts of the mono, di, tri, tetra, penta, and hexafunctional free radically curable monomers may be incorporated into the present invention, depending upon the desired properties of the final coating. For example, in order to provide coatings with higher levels of abrasion and impact resistance, it is desirable for the composition to include one or more multifunctional free radically curable monomers, preferably at least both di and tri functional free radically curable monomers, such that the free radically curable monomers incorporated into the composition have an average free radically curable functionality per molecule of greater than 1. Preferred compositions of the present invention may include 1 to 35 parts by weight of monofunctional free radically curable monomers, 0 to 75 parts by weight of difunctional free radically curable monomers, 1 to 75 parts by weight of trifunctional free radically curable monomers, 0 to 75 parts by weight of tetrafunctional free radically curable monomers, 0 to 75 parts by weight of pentafunctional free radically curable monomers, and 0 to 75 parts by weight of hexafunctional free radically curable monomers, subject to the proviso that the free radically curable monomers have an average functionality of greater than 1, preferably 1.1 to 4, more preferably 1.5 to 3.

One representative class of monofunctional free radically curable monomers suitable in the practice of the present invention includes compounds in which a carbon-carbon double bond is directly or indirectly linked to an aromatic ring. Examples of such compounds include styrene, alkylated styrene, alkoxy styrene, free radically curable naphthalene, alkylated vinyl naphthalene, alkoxy vinyl nephthalene, combinations of these, and the like. Another representative class of monofunctional, free radially curable monomers includes compounds in which a carbon-carbon double bond is attached to an cycloaliphatic, heterocyclic, and/or aliphatic moiety such as 5-vinyl-2-norbornene, 4-vinyl pyridine, 2-vinyl pyridine, 1-vinyl-2-pyrrolidinone, 1-vinyl caprolactam, 1-vinylimidazole, N-vinyl formamide, and the like.

Another representative class of such monofunctional free radically curable monomers include (meth)acrylate functional monomers that incorporate moieties of the formula:

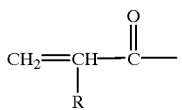

wherein R is a monovalent moiety, such as hydrogen, halogen, methyl, or the like. Representative examples of such monomers include (meth)acrylamides, chloro(meth)acrylamide, linear, branched, or cycloaliphatic esters of (meth)acrylic acid containing from 1 to 20, preferably 1–8, carbon atoms, such as methyl (meth)acrylate, n-butyl (meth)acrylate, t-butyl (meth)acrylate, ethyl (meth)acrylate, iso-propyl (meth)acrylate, and 2-ethylhexyl (meth)acrylate; vinyl esters of alkanoic acids wherein the alkyl moiety of the alkanoic acids contain 2 to 20, preferably 2 to 4, carbon atoms and may be linear, branched, or cyclic; isobornyl (meth)acrylate; vinyl acetate; allyl (meth)acrylate, and the like.

Such (meth)acrylate functional monomers may also include other kinds of functionality such as hydroxyl functionality, nitrile functionality, epoxy functionality, carboxylic functionality, thiol functionality, amine functionality, sulfonyl functionality, combinations of these, and the like. Representative examples of such free radically curable compounds include glycidyl (meth)acrylate, (meth)acrylonitrile, β-cyanoethyl-(meth)acrylate, 2-cyanoethoxyethyl (meth)acrylate, p-cyanostyrene, p-(cyanomethyl)styrene, an ester of an ,β-unsaturated carboxylic acid with a diol, e.g., 2-hydroxyethyl (meth)acrylate, or 2-hydroxypropyl (meth)acrylate; 1,3-dihydroxypropyl-2-(meth)acrylate; 2,3-dihydroxypropyl-1-(meth)acrylate; an adduct of an ,β-unsaturated carboxylic acid with caprolactone; an alkanol vinyl ether such as 2-hydroxyethyl vinyl ether; 4-vinylbenzyl alcohol; allyl alcohol; p-methylol styrene, (meth)acryloyloxyethyl trimethyl ammonium chloride, (meth)acrylamidopropyl trimethylammonium chloride, vinylbenzyl trimethylammonium chloride, 2-hydroxy-3-allyloxypropyl trimethylammonium chloride, (meth)acryloyloxypropyl dimethylbenzylammonium chloride, dimethylaminoethyl (meth)acrylate, vinylbenzyl trimethylammonium chloride, N-(3-sulfopropyl)-N-(meth)acryloyloxyethyl-N,N-dimethylammonium betaine, 2-[(meth)acryloyloxy]ethyl trimethylammonium methosulfate, N-(3-sulfopropyl)-N-(meth)acrylamidopropyl-N, N-dimethylammonium betaine, N,N-dimethylamino (meth)acrylate, (meth)acryloyloxyethyl acid phosphate, (meth)acrylamidopropyl sodium sulfonate, sodium styrene sulfonate, styrene sulfonic acid, (meth)acrylic acid, maleic acid, fumaric acid, maleic anhydride, vinyl sulfonic acid, 2-(meth)acrylamide-2-methyl-1-propanesulfonic acid, maleic anhydride, mixtures thereof, and the like.

A particularly preferred class of monofunctional free radically curable monomers suitable in the practice of the present invention includes one or more N,N-disubstituted (meth)acrylamides. Use of an N,N-disubstituted (meth)acrylamide provides numerous advantages. For example, the use of this kind of monomer provides antistatic coatings which show improved adhesion to polycarbonate substrates. Further, use of this kind of monomer also provides coatings with improved weatherability and toughness. Preferably, the N,N-disubstituted (meth)acrylamide has a molecular weight in the range from 99 to about 500, preferably from about 99 to about 200, in order to minimize the tendency, if any, of the inorganic oxide particles to flocculate and precipitate out of the ceramer composition.

The N,N-disubstituted (meth)acrylamide monomers generally have the formula:

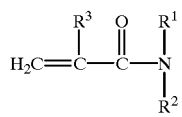

wherein $R^1$ and $R^2$ are each independently hydrogen, a $(C_1-C_8)$alkyl group (linear, branched, or cyclic) optionally having hydroxy, halide, carbonyl, and amido functionalities, a $(C_1-C_8)$ alkylene group optionally having carbonyl and amido functionalities, a $(C_1-C_{18})$ alkoxymethyl group, a $(C_4-C_{18})$aryl group, a $(C_1-C_3)$alk$(C_4-C_{18})$aryl group, or a $(C_4-C_{18})$heteroaryl group; with the proviso that only one of $R^1$ and $R^2$ is hydrogen; and $R^3$ is hydrogen, a halogen, or a methyl group. Preferably, $R^1$ is a $(C_1-C_4)$alkyl group; $R^2$ is a $(C_1-C_4)$alkyl group; and $R^3$ is hydrogen, or a methyl group. $R^1$ and $R^2$ can be the same or different. More preferably, each of $R^1$ and $R^2$ is $CH_3$, and $R^3$ is hydrogen.

Examples of such suitable (meth)acrylamides are N-(3-bromopropion-amidomethyl) acrylamide, N-tert-butylacrylamide, N,N-dimethylacrylamide, N,N-diethylacrylamide, N-(5,5-dimethylhexyl)acrylamide, N-(1,1-dimethyl-3-oxobutyl)acrylamide, N-(hydroxymethyl) acrylamide, N-(isobutoxymethyl)acrylamide, N-isopropylacrylamide, N-methylacrylamide, N-ethylacrylamide, N-methyl-N-ethylacrylamide, N-(fluoren-2-yl)acrylamide, N-(2-fluorenyl)-2-methylacrylamide, 2,3-bis(2-furyl)acrylamide, N,N'-methylene-bis acrylamide. A particularly preferred (meth) acrylamide is N,N-dimethyl (meth)acrylamide.

Other examples of free radically curable monomers include alkenes such as ethene, 1-propene, 1-butene, 2-butene (cis or trans) compounds including an allyloxy moiety, and the like.

In addition to the monofunctional free radically curable monomer, any kind of multifunctional free radically curable monomers preferably having di, tri, tetra, penta, and/or hexa free radically curable functionality also can be used in the present invention. Such multifunctional (meth)acrylate compounds are commercially available from a number of different suppliers. Alternatively, such compounds can be prepared using a variety of well known reaction schemes. For example, according to one approach, a (meth)acrylic acid or acyl halide or the like is reacted with a polyol having at least two, preferably 2 to 6, hydroxyl groups. This approach can be represented by the following schematic reaction scheme which, for purposes of illustration, shows the reaction between acrylic acid and a triol:

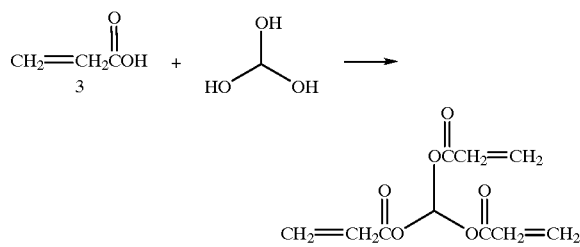

This reaction scheme as illustrated provides a trifunctional acrylate. To obtain di, tetra, penta, or hexa functional compounds, corresponding diol, tetrols, pentols, and hexols could be used in place of the triol, respectively.

According to another approach, a hydroxy or amine functional (meth)acrylate compound or the like is reacted with a polyisocyanate, or isocyanurate, or the like having 2 to 6 NCO groups or the equivalent. This approach can be represented by the following schematic reaction scheme which, for purposes of illustration, shows the reaction between hydroxyethyl acrylate and a triisocynate:

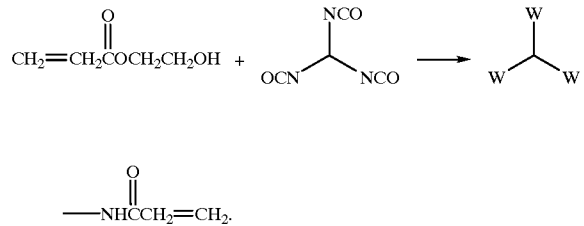

wherein each W is

This reaction scheme as illustrated provides a trifunctional (meth)acrylate. To obtain di, tetra, penta, or hexa functional compounds, corresponding multifunctional isocyanates could be used in place of the triisocyanate, respectively.

A preferred class of multifunctional (meth)acryl functional compounds includes one or more multifunctional, ethylenically unsaturated esters of (meth)acrylic acid and may be represented by the following formula:

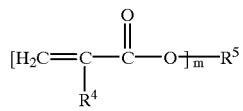

wherein $R^4$ is hydrogen, halogen or a $(C_1-C_4)$alkyl group; $R^5$ is a polyvalent organic group having m valencies and can be cyclic, branched, or linear, aliphatic, aromatic, or heterocyclic, having carbon, hydrogen, nitrogen, nonperoxidic oxygen, sulfur, or phosphorus atoms; and m is an integer designating the number of acrylic or methacrylic groups in the ester and has a value of 2 to 7. Preferably, $R^4$ is hydrogen, methyl, or ethyl, $R^5$ has a molecular weight of about 14–100, and m has a value of 2–6. More preferably, m has a value of 2–5, most preferably 3–4. Where a mixture of multifunctional acrylates and/or methacrylates are used, m preferably has an average value of about 1.05 to 3.

Specific examples of suitable multifunctional ethylenically unsaturated esters of (meth)acrylic acid are the polyacrylic acid or polymethacrylic acid esters of polyhydric alcohols including, for example, the diacrylic acid and dimethylacrylic acid ester of aliphatic diols such as ethyleneglycol, triethyleneglycol, 2,2-dimethyl-1,3-propanediol, 1,3-cyclopentanediol, 1-ethoxy-2,3-propanediol, 2-methyl-2,4-pentanediol, 1,4-cyclohexanediol, 1,6-hexamethylenediol, 1,2-cyclohexanediol, 1,6-cyclohexanedimethanol; the triacrylic acid and trimethacrylic acid esters of aliphatic triols such as glycerin, 1,2,3-propanetrimethanol, 1,2,4-butanetriol, 1,2,5-pentanetriol, 1,3,6-hexanetriol, and 1,5, 10-decanetriol; the triacrylic acid and trimethacrylic acid esters of tris (hydroxyethyl) isocyanurate; the tetraacrylic acid and tetramethacrylic acid esters of aliphatic triols, such as 1,2,3, 4-butanetetrol, 1, 1,2,2, -tetramethylolethane, 1, 1,3,3-tetramethylolpropane, and pentaerythritol tetraacrylate; the pentaacrylic acid and pentamethacrylic acid esters of aliphatic pentols such as adonitol; the hexaacrylic acid and hexamethacrylic acid esters of hexanols such as sorbitol and dipentaerythritol; the diacrylic acid and dimethacrylic acid esters of aromatic diols such as resorcinol, pyrocatechol, bisphenol A, and bis(2-hydroxyethyl) phthalate; the trimethacrylic acid ester of aromatic triols such as pyrogallol, phloroglucinol, and 2-phenyl-2,2-methylolethanol; and the hexaacrylic acid and hexamethacrylic acid esters of dihydroxy ethyl hydantoin; and mixtures thereof One combination of free radically curable monomers found to be particularly suitable in the practice of the present invention for making tough, abrasion resistant, impact resistant, optically clear antistatic coatings is a formulation including about 1 part by weight of a monofunctional N,N disubstituted (meth)acrylamide (such as N,N-dimethyl (meth)acrylamide) and about 6 parts by weight of one or more multifunctional, free radically curable monomers (such as an admixture of di, tri, and tetra functional, free radically curable monomers derived from pentaerythritol and commercially available under the trade designation "SR444" from Sartomer Co., West Chester, Pa.).

Colloidal inorganic oxide particles of the present invention are preferably non-aggregated particles, desirably substantially spherical in shape, characterized by an average particle diameter of about 5 nm to about 1000 nm, more preferably 10 nm to 50 nm. These size ranges facilitate ease of dispersion of the particles into coatable compositions and provide coatings that are smoothly surfaced and optically clear. Average particle size of the colloids can be measured using transmission electron microscopy to count the number of particles of a given diameter.

A wide range of colloidal inorganic oxide particles could be used in the present invention. Representative examples include silica and metal oxides such as alumina, tin oxide, iron oxide, zirconia, vanadia, titania, and the like, with silica being most preferred.

The colloidal inorganic oxide particles useful in preparing ceramers for use in this invention most desirably are provided as a sol rather than as a powder or a gel. In the sol state, the colloidal inorganic oxide particles are dispersed in a liquid medium. Representative examples of liquid media suitable as dispersants for the colloidal particles include water, aqueous alcohol solutions, lower aliphatic alcohols, toluene, ethylene glycol, dimethyl acetamide, formamide, and combinations thereof The preferred liquid medium is water. When the colloidal particles are dispersed in water, the particles are stabilized on account of common electrical charges on the surface of each particle. The common electrical charges tend to promote dispersion rather than agglomeration, because the similarly charged particles repel one another, thereby preventing aggregation. By contrast, in the powder state, such as in fumed silica or silica gel, uncharged colloidal particles will agglomerate to form networks and thus will not provide a uniform dispersion of particles when combined with the organic components of the ceramer compositions. Preferred ceramers are easily distinguished from otherwise similar compositions that comprise agglomerated colloidal inorganic oxide particles. When the sol-derived colloidal inorganic oxide particles in a ceramer are replaced with the same weight fraction of agglomerated colloidal inorganic oxide particles, wetted powder results.

Sols useful in the practice of the present invention may be prepared by methods well known in the art. Suitable sols are also commercially available. For example, colloidal silicas dispersed as sols in aqueous solutions are commercially available under the tradename "NALCO" (Nalco Chemical Co., Oak Brook, IU.). Examples include NALCO 2327, NALCO 1040, NALCO 1060, NALCO 1030, NALCO 1115, and the like.

The colloidal inorganic oxide particles of the present invention are characterized as having a negative surface charge, which is balanced by a suitable counter cation. Advantageously, negatively charged colloids and the antistatic agent described herein are a synergistic combination that provides ceramer coatings with superior antistatic capabilities. While not wishing to be bound by theory, a possible rationale to explain the synergy between the negatively surface charged colloids and the salts of perfluorinated anions can be suggested. In many of the previously known antistatic coatings, channels for dissipating static charge are located primarily on the surfaces of such coatings. In contrast, it is believed that the negatively charged colloids and salts of perfluorinated anions of the present invention, which are interspersed throughout the interior volume of the coating, provide not only surface channels, but also internal channels for dissipating static charges.

Generally, a negative surface charge is provided by using a sol having an appropriate pH. For example, in those embodiments of the invention in which the colloidal inorganic oxide particles are silica or tin oxide derived from an aqueous sol, a negative surface charge is assured when the sol has a pH greater than 7, preferably greater than 8, and more preferably greater than 9.

A variety of cations can be used in the sol to counter the negatively surface charged colloids. Examples of such cations include $Na^+$, $K^+$, $Li^+$, a quaternary ammonium cation such as $NR_4^+$, wherein each R may be any monovalent moiety, but is preferably H or $CH_3$, combinations of these, and the like. Preferably, however, the cation is quaternary ammonium such as $NH_4^+$ in that quaternary ammonium is a much better electrical conductor than the other listed cations. Resultant anhydrous ceramer compositions including quaternary ammonium also tend to be more stable over time than compositions including the other cations. Further, coatings prepared from compositions including quaternary ammonium as a counter cation for the silica particles provide substantially better antistatic protection as compared to coatings incorporating the other cations. In preferred embodiments, the improvement is many orders of magnitude. Further, ceramer compositions including quaternary ammonium and a nonaqueous solvent (the preparation of such compositions will be described below) tend to have better optical clarity, i.e., higher light transmittance, as compared to other cations. To achieve such advantages, $NH_4^+$, for example, may be provided quite easily merely by adding $NH_4OH$ to the sol. Advantageously, $NH_4OH$ not only serves as a source of $NH_4^+$, but it also helps provide the sol with a basic pH.

The negatively charged, colloidal, inorganic oxide particles tend to be very sensitive to other charges in the ceramer composition. Because of this sensitivity, it has been very difficult to identify any kind of ionic antistatic agents that can be used in combination with the charged colloids without causing the colloids to flocculate. It has now been discovered, however, that surface treating the colloids and using an antistatic agent that is a salt of perfluorinated anions in combination provides a system in which the anionic antistatic agent is unexpectedly extremely compatible with the surface treated charged colloids. Salts of perfluorinated anions can be used with surface treated charged colloids without causing flocculation, especially when the perfluorinated moieties of the salts are sufficiently compact such that the perfluorinated moieties of the salts are soluble in the curable binder component. In contrast, if the perfluoro moieties are too big, then flocculation may occur and the ceramer composition could, as a result, lose its desired optical and Theological properties. Particularly, optical clarity and low viscosity characteristics could be adversely affected. Also, an oily film may form on the surface of the resultant coating.

While not wishing to be bound by theory, it is believed that surface treatment of the colloidal inorganic oxide particles enhances the dispersibility of the particles in ceramer compositions because, in practical effect, the surface treatment coats the particle surfaces, thereby protecting those surfaces and adding steric bulk (i.e., a spacing layer) around the particles. Surface treatment thus makes it more difficult for the antistatic agent to adversely interact with the particles. Surface treatment generally involves reacting a sol containing the colloidal particles with a surface treatment agent such that the surface treatment agent interacts with and bonds to the surfaces of the particles. This procedure will be described and illustrated below, particularly in the Examples.

Any surface treatment agent capable of interacting with the surfaces of the colloidal inorganic oxide particles may be used with beneficial results. Preferred surface treatment agents are hydrolyzable organofunctional silane compounds. Such compounds are also referred to as "silane coupling agents". Examples of silane coupling agents suitable for this invention include acryloxyalkyl trimethoxysilane, methacryloxyalkyl trimethoxysilane, (meth)acryloxyalkyl triethoxysilane, (meth)acryloxyalkyl trichlorosilane, phenyl trichlorosilane, phenyl trimethoxysilane, phenyl triethoxysilane, vinyl trimethoxysilane, vinyl triethoxysilane, vinyl trichlorosilane, methyl trimethoxysilane, methyl triethoxysilane, propyl trimethoxysilane, propyl triethoxysilane, glycidoxyalkyl trimethoxysilane, glycidoxyalkyl triethoxysilane, glycidoxyalkyl trichlorosilane, perfluoro alkyl trialkoxysilane, perfluoromethyl alkyl trialkoxy silane, perfluoro alkyl trichlorosilane, and mixtures thereof.

Although any surface treatment agent may be used, it is preferred that the colloidal inorganic oxide particles are surface treated with a coupling agent such that the colloids are (meth)acrylate functionalized in those embodiments in which the curable binder component is radiation curable. Advantageously, the functionalized particles can copolymerize with the radiation curable binder component when the ceramer composition is exposed to a curing dosage of radiation such as heat, visible light, ultraviolet light, or electron beam radiation. Typically, in the case of colloidal silica particles, the silica particles are functionalized by adding a silyl(meth)acrylate to an aqueous sol of colloidal silica. Examples of preparing acrylate functionalized colloidal silica are described in U.S. Pat. Nos. 4,491,508 and 4,455,205 to Olsen et al.; U.S. Pat. Nos. 4,478,876 and 4,486,504 to Chung; and U.S. Pat. No. 5,258,225 to Katsamberis, all of which are herein incorporated by reference.

Generally, the antistatic agent comprises a salt of a perfluorinated anion comprising at least one perfluorinated moiety such as a perfluoralkyl, perfluoroalkoxy, and/or perfluoroalkylene moiety. The size of the perfluoro moiety or moieties, as the case may be, may dramatically affect the performance of the antistatic agent. Preferably, therefore, each perfluorinated moiety of the perfluorinated anion includes no more than 1 to 4 carbon atoms to ensure that the anion does not destabilize the colloids and cause flocculation. Examples of such compact monovalent and divalent perfluorinated moieties include $CF_3$—, $CF_3CF_2$—, —$CF_2CF_2$—, —$CF_2CF_2CF_2$—, $CF_3O$—, combinations of these, and the like. Most preferably, any perfluoroalkyl moiety is $CF_3$—, any perfluoroalkoxy moiety is $CF_3O$—, and any perfluoroalkylene moiety is —$CF_2$— or —$CF_2CF_2$—.

The salt of the perfluorinated anion further comprises a countercation effective to neutralize the negative electrical charge associated with the anion. Examples of suitable countercations include $Na^+$, $K^+$, $Li^+$, quaternary ammonium such as $NH_4^+$, combinations of these, and the like. Preferably, the cation is $Li^+$ in that salts including $Li^+$ as the countercation help dissipate static charges substantially faster than salts including one of the other cations. Such salts are also much more compatible with other ingredients of the composition.

One class of salts of a perfluorinated anion found to be particularly suitable in the practice of the present invention comprises perfluorinated sulfonyl containing salts. Perfluorinated sulfonyl containing salts may be represented by compounds of the following formulae:

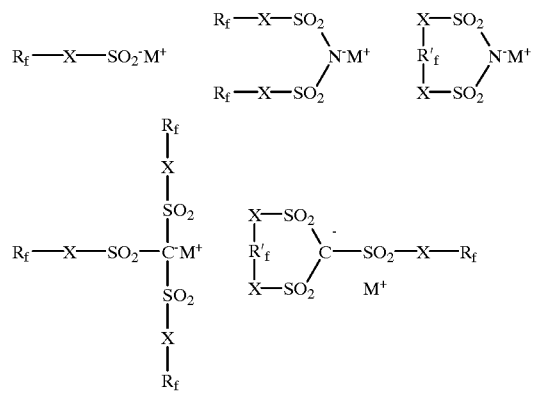

wherein each $R_f$ is independently a monovalent perfluorinated moiety of 1 to 4 carbon atoms; each $R'_f$ is independently a divalent perfluorinated group; each X is independently a divalent linking group such as oxygen or a single bond; and each $M^+$ is independently selected from $Na^+$, $K^+$, $Li^+$, quaternary ammonium such as $NH_4^+$, combinations of these, and the like. Preferably, each $R_f$ is $CF_3$—, each $R'_f$ is —$CF_2CF_2$— or —$CF_2CF_2CF2$—, and each M is $Li^+$. A description of perfluorinated sulfonyl containing salts and their synthesis can be found in U.S. Pat. Nos. 4,505,997, 5,021,308, 5,072,040, 5,162,177, and 5,273,840, incorporated herein by reference.

Specific examples of perfluoroalkyl sulfonates, perfluoroalkylsulfonyl imides or perfluoroalkylsulfonyl methides including $Li^+$ cations are illustrated below. However, the present invention is not limited to the following examples:

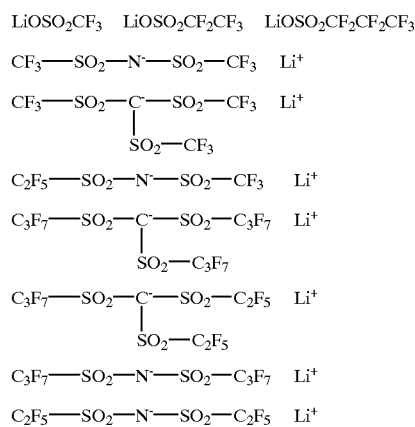

-continued

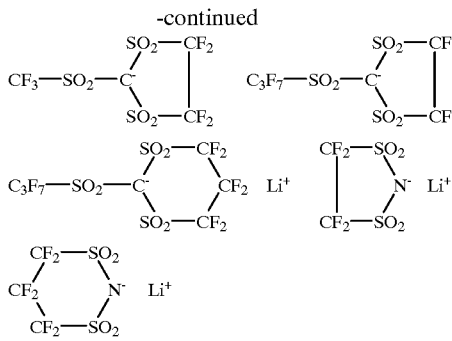

The ceramer compositions of the present invention further incorporate a nonionic surfactant. Preferred nonionic surfactants comprise both a surface active moiety which is insoluble in the curable binder component as well as a polyalkylene oxide moiety. Generally, the polyalkylene oxide moiety contains a plurality of repeating units of the formula —$(R^5O)$—, wherein each —$R^5O$— is independently a divalent alkylene oxide moiety of 1 to 6, preferably 1 to 3 carbon atoms. Examples of such moieties include methylene oxide, ethylene oxide, propylene oxide, combinations of these, and the like. Preferably, such repeating units comprise ethylene oxide, —$CH_2CH_2O$—, as a repeating unit in that a polyalkylene oxide moiety, including ethylene moieties is an extremely effective solvent for the counter cations, especially $Li^+$, of the perfluorinated anion. Desirably, the nonionic surfactant includes 6 to 60 of such repeating units.

The insoluble moiety of the nonionic surfactant may be any moiety which is sufficiently insoluble in the curable binder component such that the moiety tends to seek out the surface of the curable binder component. Representative examples of such moieties include perfluorinated moieties having a sufficient number of carbon atoms, e.g., 5 or more, so as to be insoluble in the curable binder, a polysiloxane moiety, a hydrocarbon moiety having 8 to 20 carbon atoms, combinations of these, and the like.

Examples of nonionic surfactants incorporating a polyalkylene oxide and an insoluble perfluorinated moiety (nonionic perfluoro surfactant) may be represented by the following formula:

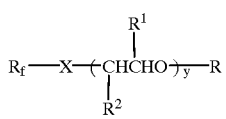

wherein $R_f$ includes a perfluorinated moiety such as a perfluoroalkyl group, a perfluoroalkylene group, a perfluorocycloalkyl group, a perfluoroalkoxy group, and a perfluorocycloalkylene group having from 5 to 16 carbon atoms, X can be any divalent linking group such as —O—, —$SO_2NR^3$—, —$CONR^4$—, —$CH_2O$—, or a single bond; R, $R^1$, $R^2$, $R^3$, and $R^4$ are, independently, hydrogen or a lower alkyl of from 1 to 4 carbon atoms; and y is a number from 6 to 60, preferably 6 to 30. A particularly preferred class of nonionic perfluoro surfactants is the Zonyl™ family of surfactants available from E.I. duPont de Nemours and Company under the designations "FSN", "FSO", "FSP", "VR", and the like. Other useful nonionic perfluoro surfactants are listed below:

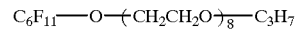
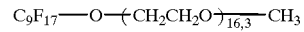
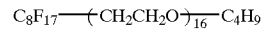
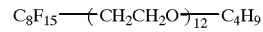
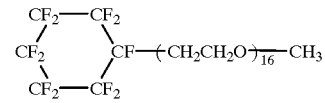
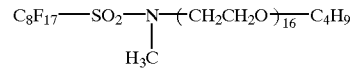
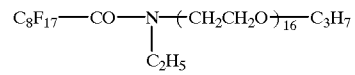
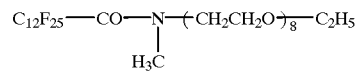
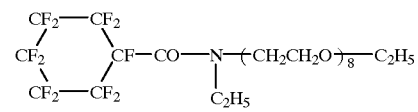

Suitable nonionic surfactants incorporating a polyalkylene oxide moiety and an insoluble polysiloxane moiety (nonionic polysiloxane surfactant) may comprise compounds in which the polysiloxane moiety has a linear, polysiloxane backbone having polyalkylene oxide units (such as the —$R^5O$— units defined above) pendant from the polysiloxane backbone. The polyalkylene oxide units are preferably linked to the polysiloxane through ether linkages. The polyalkylene oxide moiety of the nonionic polysiloxane surfactant may also have the structure —$R^5O$— as defined above. Examples of such nonionic polysiloxane surfactants may be represented by the following formula:

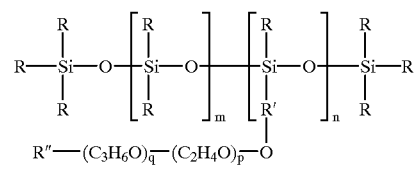

wherein each R is independently a lower alkyl having from 1 to 4 carbon atoms, R' is a lower alkylene moiety having from 1 to 4 carbon atoms, R" is hydrogen or a lower alkyl moiety of from 1 to 4 carbon atoms, m is an integer from 5 to 100, n is an integer from 2 to 50, p is an integer from 5 to 50, and q is an integer from 0 to 50. Compounds of this class are sold by Union Carbide Co., under the trade name of Silwet™, and include Silwet™ L-7605, Silwet™ L-77, Silwet™ L-7001, and the like.

Another class of suitable non-ionic polyoxyethylene surfactants of the present invention can be represented by the following formula:

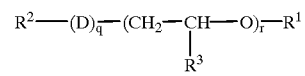

wherein $R^2$ represents an alkyl group having 1 to 30 carbon atoms, an alkenyl group having 1 to 30 carbon atoms, or an aryl group having 6 to 30 ring atoms (such as phenyl or naphthyl) or a combination thereof, $R^1$ and $R^3$ each independently represent a hydrogen atom or a methyl group, D represents a divalent group such as —O—, —S—, —COO—,—NR$_4$—,—CO—NR$_4$—, or —SO$_2$—NR4—, wherein each R$_4$ may independently represent a hydrogen atom or an alkyl group having 1 to 12 carbon atoms, q represents 0 or 1 and r represents an integer of 2 to 50. Examples of non-ionic polyoxyalkylene surfactants according to this formula are illustrated below.

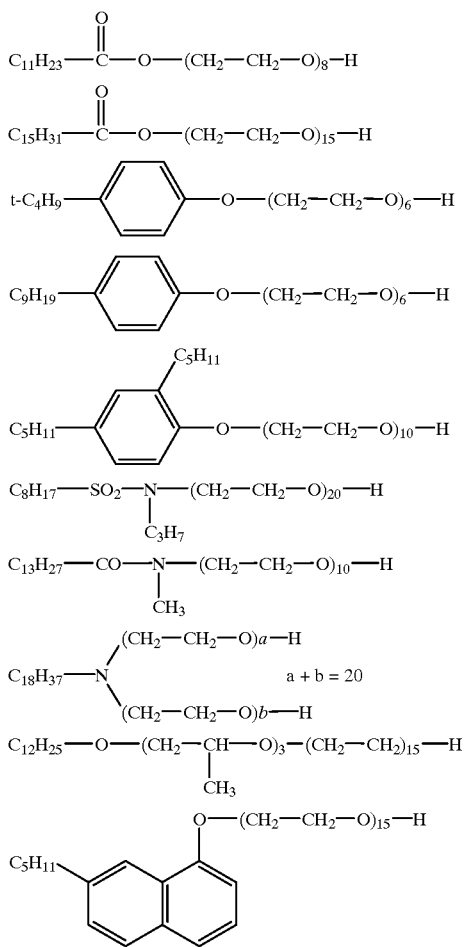

In addition to the curable binder component, the surface treated inorganic oxide particles, the antistatic agent, and the nonionic surfactant, the ceramer composition may further include a solvent and other optional additives. For example, if desired, the composition may include a solvent to reduce the viscosity of the composition in order to enhance the coating characteristics. The appropriate viscosity level depends upon various factors such as the coating thickness, application technique, and the type of substrate material onto which the composition is applied. In general, the viscosity of the coating precursor composition at 25° C. is about 1–200 centipoise, preferably about 3–75 centipoise, more preferably about 4–50 centipoise, and most preferably about 5–20 centipoise when measured using a Brookfield viscometer with a No. 2 cv spindle at a spindle speed of 20 rpm. In general, sufficient solvent is used such that the solids content of the composition is about 5–99%, preferably about 10–70%, more preferably about 15–50%, and most preferably about 30% by weight solids.

The solvent is selected to be compatible with the other components included in the composition. As used in this context, "compatible" means that there is minimal phase separation between the solvent and the other components. Additionally, the solvent should be selected such that the solvent does not adversely affect the curing properties of the composition or attack the material of the substrate. Furthermore, the solvent should be selected such that it has an appropriate drying rate. That is, the solvent should not dry too slowly, which would slow down the process of making a coated substrate. It should also not dry too quickly, which could cause defects such as pin holes or craters in the resultant coating. The solvent can be an organic solvent, water, or combinations thereof. Representative examples of suitable solvents include lower alcohols such as ethanol, methanol, isopropyl alcohol, and n-butanol; ketones such as methyl ethyl ketone and methyl isobutyl ketone; glycols; glycol ethers; combinations thereof, and the like. Most preferably, the solvent is isopropanol. Using the procedure described below for making a ceramer composition, the solvent may also include a small amount, e.g. about 2% by weight, of water.

The ceramer compositions of the present invention also may include a leveling agent to improve the flow or wetting of the composition on the substrate. If the composition does not properly wet the substrate, this can lead to visual imperfections (e.g., pin holes and/or ridges) in the coating. Examples of leveling agents include, but are not limited to, alkylene oxide terminated polysiloxanes such as that available under the trade designation "DOW 57" (a mixture of dimethyl-, methyl-, and (polyethylene oxide acetate-capped) siloxane) from Dow Corring, Midland, Mich., and fluorochemical surfactants such as those available under the trade designations FC430, FC431, and FX313 from 3M Co., St. Paul, Minn. The coating precursor composition can include an amount of a leveling agent effective to impart the desired result. Preferably, the leveling agent is present in an amount up to about 3% by weight, and more preferably about 0.5–1%, based on the total weight of the composition solids. It should be understood that combinations of different leveling agents can be used if desired.

During the manufacture of an abrasion resistant coating of the type including a free radically curable binder component, the coated composition preferably is exposed to an energy source, e.g., heat or radiation, that initiates the curing process of the ceramer coating. This curing process typically occurs via a free radical mechanism, which can require the use of a free radical initiator (simply referred to herein as an initiator, e.g., a photoinitiator or a thermal initiator) depending upon the energy source used. If the energy source is an electron beam, the electron beam generates free radicals and no initiator is typically required. If the energy source is heat, ultraviolet light, or visible light, an initiator is often required. When the initiator is exposed to one of these energy sources, the initiator generates free radicals, which then initiates the polymerization and crosslinking.

Examples of suitable free radical thermal initiators include, but are not limited to, peroxides such as benzoyl peroxide, azo compounds, benzophenones, and quinones. Examples of photoinitiators that generate a free radical source when exposed to visible light radiation include, but are not limited to, camphorquinones/alkyl amino benzoate mixtures. Examples of photoinitiators that generate a free radical source when exposed to ultraviolet light include, but are not limited to, organic peroxides, azo compounds, quinones, benzophenones, nitroso compounds, acryl halides, hydrozones, mercapto compounds, pyrylium compounds, triacrylimidazoles, bisimidazoles, chloroalkytriazines, benzoin, benzoin methyl ether, benzoin ethyl ether, benzoin isopropyl ether, benzoin isobutyl ethers and methylbenzoin, diketones such as benzil and diacetyl, phenones such as acetophenone, 2,2,2-tri-bromo- 1-phenylethanone, 2,2-diethoxyacetophenone, 2,2-dimethoxy-2-phenylacetophenone, 2,2,2, -tribromo- 1 (2-nitrophenyl) ethanone, benzophenone, 4,4-bis(dimethyamino) benzophenone, and acyl phosphates. Examples of commercially available ultraviolet photoinitiators include those available under the trade designations "IRGACURE 184" (1-hydroxycyclohexyl phenyl ketone), "IRGACURE 361" and "DAROCUR 1173" (2-hydroxy-2-methyl-1-phenyl-propan-1-one) from Ciba-Geigy. Typically, if used, an amount of an initiator is included in the ceramer composition to effect the desired level and rate of cure. Preferably, the initiator is used in an amount of about 0.1–10%, and more preferably about 2–4% by weight, based on the total weight of the ceramer composition without solvent. It should be understood that combinations of different initiators can be used if desired.

In addition to the initiator, the ceramer composition of the present invention can include a photosensitizer. The photosensitizer aids in the formation of free radicals that initiate curing of the prepolymers, especially in an air atmosphere. Suitable photosensitizers include, but are not limited to, aromatic ketones and tertiary amines. Suitable aromatic ketones include, but are not limited to, benzophenone, acetophenone, benzil, benzaldehyde, and o-chlorobenzaldehyde, xanthone, tioxanthone, 9,10-anthraquinone, and many other aromatic ketones. Suitable tertiary amines include, but are not limited to, methyldiethanolamine, ethyldiethanolamine, triethanolamine, phenylmethyl-ethanolamine, dimethylaminoethylbenzoate, and the like. Typically, if used, an amount of initiator is included in the precursor compositions to effect the desired level and rate of cure. Preferably, the amount of photosensitizer used in the compositions of the present invention is about 0.01–10%, more preferably about 0.05–5%, and most preferably about 0.25–3% by weight, based on the total weight of the ceramer composition without solvent. It should be understood that combinations of different photosensitizers can be used if desired.

Polymeric materials are known to degrade by a variety of mechanisms. Common additives that can offset this are known as stabilizers, absorbers, antioxidants, and the like. The compositions of the present invention can include one or more of the following: ultraviolet stabilizer, ultraviolet absorber, ozone stabilizer, and thermal stabilizer/antioxidant.

An ultraviolet stabilizer and/or ultraviolet absorber improves weatherability and reduces the "yellowing" of the abrasion resistant coating with time. An example of an ultraviolet stabilizer includes that available under the trade designation "TINUVIN 292" (bis(1,2,2,6,6-pentamethyl-4-piperidinyl)sebacate) and an example of an ultraviolet absorber includes that available under the trade designation "TINUVIN 1130" (hydroxyphenyl benzotriazole), both of which are available from Ciba-Geigy. The composition can include an amount of either an ultraviolet stabilizer and/or an ultraviolet absorber to impart the desired result. Preferably, the ultraviolet stabilizer or absorber is present in an amount up to about 10% by weight, and more preferably about 1–5%, based on the total weight of the ceramer composition without solvent. It should be understood that combinations of different ultraviolet stabilizers and absorbers can be used if desired.

An ozone stabilizer protects against degradation resulting from reaction with ozone. Examples of ozone stabilizers include, but are not limited to, hindered amines such as that available under the trade designation "IRGONOX 1010" available from Ciba-Geigy and phenoltriazine commercially available from Aldrich. The ceramer composition can include an amount of an ozone stabilizer to impart the desired result. Preferably, the ozone stabilizer is present in an amount up to about 1% by weight, more preferably about 0.1–1.0%, and most preferably about 0.3–0.5%, based on the total weight of the ceramer composition without solvent. It should be understood that combinations of different ozone stabilizers can be used if desired.

A thermal stabilizer/antioxidant reduces the amount of yellowing as a result of weathering. Examples of such materials include, but are not limited to, low melting hindered phenols and triesters. Specific examples include 2,6-di-tert-butyl-4-methylphenol commercially available under the trade designation "ULTRANOX 226" antioxidant from Borg Warner Chemicals, Inc., Parkersburg, N.Y.; octadecyl 3,5-di-tert-butyl-4-hydroxyhydroxcinnamate commercially available under the trade designations "ISONOX 132" antioxidant (Schenectady Chemicals, Inc., Schenectady, N.Y.) or "VANOX 1320" antioxidant (Vanderbilt Co., Inc., Norwalk, Conn.). The coating precursor composition can include an amount of the thermal stabilizer/antioxidant to impart the desired result. Preferably, the thermal stabilizer/antioxidant is present in an amount up to about 3% by weight, and more preferably about 0.5–1%, based on the total weight of the coating precursor composition without solvent. It should be understood that combinations of different thermal stabilizers/antioxidants can be used if desired.

According to one approach for making an antistatic, coatable, ceramer composition of the present invention, an aqueous sol of colloidal inorganic oxide particles e.g., silica, is provided. The sol should have a pH such that the particles have a negative surface charge. For example, if the particles are silica, the sol should be alkaline with a pH greater than 7, preferably greater than 8, more preferably greater than 9. It is preferred that the sol include ammonium hydroxide or the like so that $NH_4^+$ is available as a counter cation for the particles having the negative surface charge.

A suitable surface treatment agent is then blended into the sol. One preferred class of coupling agents is the silyl(meth) acrylates of which the following silane coupling agent is a representative example:

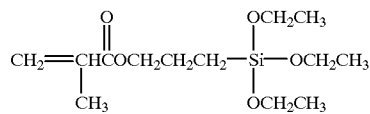

This kind of coupling agent reacts with the colloidal particles such that the $SiO_x$ moiety bonds to the particles, while the carbon-carbon double bond remains available for copolymerization with the curable binder component to the extent the curable binder component includes radiation curable materials. Typically, about 10 parts by weight of the surface treatment agent is used per 100 parts by weight of colloidal particles.

After the surface treatment agent is allowed to react with the particles, the curable binder component, such as the free radically curable monomers, is added to the composition. The composition is then heated to remove substantially all of the water. For example, removing about 98% of the water, thus leaving about 2% water in the composition, has been found to be suitable. When the curable binder component comprises free radically curable prepolymers, the resultant dried composition is a clear liquid. As soon as substantially all of the water is removed, an organic solvent of the type described above is added, if desired, in an amount such that the composition includes from 50% to about 90% by weight solids. After adding the solvent, the antistatic agent and the nonionic surfactant may be added. The preferred antistatic agents and nonionic surfactants described above are very soluble in the composition and dissolve very quickly. After these ingredients are dissolved, catalyst, initiator, color dyes, and any other desired optional additives may be added.

The resultant composition is then coated onto any substrate for which it is desired to improve the abrasion resistance, impact resistance, antistatic properties, combinations of these, or the like while also maintaining optical clarity if desired. Examples of such substrates include any and all thermosetting or thermoplastic items such as camera lenses, eyeglass lenses, binocular lenses, retroreflective sheeting, automobile windows, building windows, train windows, boat windows, aircraft windows, vehicle headlamps and taillights, display cases, eyeglasses, watercraft hulls, road pavement markings, overhead projectors, stereo cabinet doors, stereo covers, furniture, bus station plastic, television screens, computer screens, watch covers, instrument gauge covers, optical and magneto-optical recording disks, and the like.

Any suitable coating technique can be used for applying the composition to the substrate, depending upon the nature of the substrate, the viscosity of the composition, and the like. Examples of suitable coating techniques include spin coating, gravure coating, flow coating, spray coating, coating with a brush or roller, screen printing, knife coating, curtain coating, slide curtain coating, extrusion, squeegee coating, and the like. Typical protective coatings of the present invention have a thickness in the range from about 1 micron to about 100 microns, preferably about 2 to about 50 microns, more preferably about 4 to about 9 microns. Generally, coatings that are too thin may not have sufficient abrasion and/or impact resistance, and films that are too thick may tend to be too heavy depending upon the nature of the substrate. Also, thicker films, may have more of a tendency to crack.

After coating, the solvent is flashed off with heat. If radiation curable, the coated composition is then cured by irradiation with a suitable form of energy, such as heat energy, visible light, ultraviolet light or electron beam radiation. Irradiating with ultraviolet light in ambient conditions is presently preferred due to the relative low cost and speed of this curing technique. Irradiation causes the radiation curable prepolymers and the functionalized silica particles to crosslink together to form a coating comprising a polymer matrix having the particles, the antistatic agent, the nonionic surfactant, and the optional additives, if any, interspersed in the polymer matrix. The resultant coated substrate is thereby protected against abrasion resistance, impact resistance, and static charge build up.

According to an alternative approach for making a ceramer coating of the present invention in which the polymeric matrix is a partially hydrolyzed organofunctional silane resin, an excess of organofunctional silane monomers is added to an aqueous sol of the type described above. "Excess" means that enough of the silane monomers are added to both surface treat the colloids as well as form the polymeric matrix. Generally, adding 70 parts by weight of silane monomers per 30 parts by weight of colloids would be suitable. The antistatic agent and surfactant are also added, as described above.

Generally, the organofunctional silane monomers will begin to crosslink upon being added to the aqueous sol. If the sol is not going to be used immediately, the shelf life can be extended up to about one month by adding isopropyl alcohol to the composition and then keeping the composition cooled in dry ice. Generally, adding enough isopropyl alcohol such that the resultant composition includes about 50% by weight isopropyl alcohol would be suitable. When ready to be coated, the composition may be coated onto the desired substrate as described above. The coating is then baked to flash off solvent and thermally cure the silane monomers.

The present invention will now be further described with reference to the following Examples. Test procedures used throughout the Examples were as follows:

Test Procedure I

Surface Resistivity Test.

This test was conducted according to the procedure of ASTM Standard D-257 "D.C. Resistance or Conductance of Insulating Materials". The film samples were cut into 45×54 mm samples and conditioned for at least 3 hours at 21±1%, 30±1% and 38±1% RH (relative humidity) with the ambient temperature kept constant at 23±1° C. The surface resistivity ($\rho_s$) was measured under these conditions using an ETS Model 872 Wide Range Resistance Meter fitted with a Model 803B probe (Electro-Tech Systems, Inc., Glenside, Pa.). This apparatus applies an external voltage of 100 Volts across two concentric ring electrodes and provides surface resistivity readings in the recommended range from $10^3$ to $10^{12}$ ohm/square with $6\times10^{13}$ ohm/square being the uppermost limit detectable by the apparatus. Within the context of the present invention, samples that display surface resistivities equal or higher than $6\times10^{13}$ ohm/square are considered not antistatic.

Test Procedure II

Determination of Static Charge Dissipation Time (CDT).

In this test, the static charge dissipation characteristics of coated and uncoated polyester film samples were measured. The films were cut into 45×54 mm samples and conditioned for at least 3 hours at 21±1%, 30±1% and 38±1% relative humidity (RH) at T=23±1° C. The CDT was measured according to Federal Test Method Standard 101B, Method 4046, "Antistatic Properties of Materials" using an ETS Model 406C Static Decay Test Unit (manufactured by Electro-Tech Systems, Inc., Glenside, Pa.). This apparatus deposits a charge on the surface of the film by a high voltage (5000 Volt) corona discharge and a fieldmeter allows observation of the decay time of the surface voltage from 5000 Volt to 0 Volt. The lower the static discharge times, the better the antistatic properties of the film. All reported values of the CDTs (See Table I) in this invention are averages over at least 4 separate determinations. Values in Table I labeled "infinity" indicate that the material tested is not antistatic, i.e. the tested sample has an initial static charge which cannot be removed by surface conduction. This initial static charge is detected by the fieldmeter of the Static Decay Test Unit as soon as the sample is placed in the test electrodes even in the absence of an external applied voltage.

Test Procedure III

Determination of the Optical Clarity.

The relative optical clarity of all samples in the following examples were determined by measuring their haze according to the procedure of ASTM Standard D-1003-95 "Standard Test Method for Haze and Luminous Transmittance of Transparent Plastics", wherein the method recommended in paragraph X2 "Alternative Haze (Short-cut) Procedure" was followed. In this short-cut procedure the observed haze of a sample (i.e. the percent of transmitted light that is scattered so that its direction deviates more than a specified angle from the direction of the incident beam) was determined at 23° C. using a Pacific Instruments model XL211 Hazemeter (Gardner Neotec Instrument Division, Silver Springs, Md.) equipped with an integrating sphere. The lower the percent haze value, the higher the optical clarity of the sample under consideration. Within the context of this invention, samples that display a percent haze equal to or less than 10 are judged to be of acceptable optical clarity.

EXAMPLE 1

This example determines the typical antistatic properties of the bare polyester film used as the coating substrate throughout the examples of this invention.

Sheets of bare polyester film having a thickness of 175 micrometer (obtained from ICI America under the designation 505P) were humidity conditioned and subjected to Test Procedures I and II above. As seen in Table I, the surface resistivity of these samples exceeded $6 \times 10^{13}$ ohm/square (which is the uppermost limit of the instrument) at all humidity levels; their charge dissipation times were infinite, indicating that the bare (uncoated) sheets of polyester film used throughout the examples of this invention are not antistatic. As shown in Table I, the percent haze of these sheet samples, determined according to Procedure II, was found to be 0.6, indicating excellent optical clarity.

EXAMPLE 2

This example illustrates the typical chemical preparation, coating and curing of a ceramer hardcoat derived from an alkaline silica sol.

In a round-bottomed flask were mixed 1195 g Nalco 2327 silica sol (an ammonium ion-stabilized dispersion) having a pH of 9.3 of colloidal silica particles (40% solids) with an average particle diameter of 20 nanometers, available from Nalco Chemical Co., Chicago, Ill., 118 g N,N-dimethyl acrylamide (Aldrich Chemical Co.), 120 g 3-(trimethoxysilyl)propyl methacrylate coupling agent (Aldrich ) and 761 g Pentaerythritol acrylate (Aldrich). The round-bottomed flask was then mounted on the vacuum line of a Buchi R152 Rotavapor (Buchi Laboratory AG, Flanil, Switzerland) with the bath temperature set at 55° C. A refrigerated mixture of 50% deionized water/50% antifreeze (Texaco) recirculated through the cooling coils. Volatile components were removed at a reduced pressure of 25 Torr until the distillation rate was reduced to less than 5 drops per minute (approximately 2 hours). The resulting material (1464 g) was a clear liquid dispersion of acrylated silica particles in a mixture of N,N dimethyl acrylamide and pentaerythritol acrylate monomers (a ceramer).

4 parts of the above ceramer were added to 21 parts isopropanol and 0.14 parts Irgacure 184 photoinitiator to form a 16% clear, crosslinkable ceramer dispersion in isopropanol. This 16% dispersion was coated onto polyester sheets. Immediately after coating, the coated sheets were placed in a forced air convection oven for 2.5 minutes at 67° C. to flash off the isopropanol. Next, the coated sheets were placed onto the conveyor belt of a UV Curing Station (Model MC-6RQN, Fusion UV Curing Inc., Rockville, Md.) equipped with a Fusion "H" lamp. The resulting cured coatings on the polyester sheets were perfectly clear to the eye. The average percent haze of the coated sheets, measured according to Test Procedure III was 0.7%.

Samples of the cured coating were conditioned to 21%, 30% and 38% relative humidity and their surface resistivity measured according to Test Procedures I and II. It is seen from Table I that the surface resistivities for this example exceeded $6 \times 10^{13}$ ohm/square at all three humidity levels, while the charge dissipation times were infinite in all cases, indicating that the cured ceramer coating is not antistatic.

EXAMPLE 3

This example illustrates the effect of adding both a siloxane-terminated polyalkelene oxide, nonionic surfactant and a perfluorinated lithium salt $LiSO_3CF_3$ upon the antistatic properties of the cured ceramer of Example 2.

To 22.5 g of the 16% ceramer dispersion of Example 2 were added with vigorous agitation 0.6 g of a 16% solution of lithium trifluoromethanesulfonate $LiSO_3CF_3$ (Aldrich) in isopropanol and 0.3 g of a 16% solution of Dow Corning™ 57 surfactant in isopropanol (Dow Corring™ 57 is a surfactant additive mixture containing polyethylene glycol diacetate, polyethylene glycol monoallyl ether acetate, and dimethyl, methyl(polyethylene oxide acetate-capped) siloxane). The resulting dispersion was somewhat hazy, but the addition of 1.0 g deionized water rendered the dispersion crystal clear. The clarified dispersion was coated and cured on polyester sheets in exactly the same fashion as in Example 2. The average percent haze of the coated sheets was 1.4%. As seen in Table I, the observed charge decay times of the coating after the required humidity conditioning dramatically dropped to 1.54 seconds at 21% R.H 0.8 seconds at 30% R.H. and 0.6 seconds at 38% R.H. Similarly, the observed surface resistivities significantly dropped to $4 \times 10^{11}$ ohm/square at 21% R.H., $1.9 \times 10^{11}$ ohm/square at 30% R.H. and $6 \times 10^{10}$ ohm/square at 38% R.H.

EXAMPLE 4

This example illustrates the effect of adding both a perfluoro-terminated polyalkelene oxide surfactant and perfluorinated lithium salt $LiSO_3CF_3$ on the antistatic properties of the cured ceramer of Example 2.

To 22.5 g of the 16% ceramer dispersion of Example 2 were added with vigorous agitation 0.6 g of a 16% solution of lithium trifluoromethanesulfonate ($LiSO_3CF_3$) and 0.6 g of a 16% solution of Zonyl™ FSN fluorosurfactant in isopropanol (Zonyl™ FSN is a fluorocarbon-terminated polyethylene oxide surfactant available from Aldrich Chemical Co., Milwaukee, Wis.). The resulting dispersion was somewhat hazy, but the addition of 0.5 g deionized water rendered the dispersion crystal clear. The clarified dispersion was coated and cured on polyester sheets in exactly the same fashion as in Example 2. The average percent haze of the coated sheets was 1.3%. As seen in Table I, the observed charge decay times of the coating after the required humidity conditioning dramatically dropped to 2.3 seconds at 21% R.H, 0.9 seconds at 30% R.H. and 0.6 seconds at 38% R.H. Similarly, the observed surface resistivities significantly dropped to $7 \times 10^{11}$ ohm/square at 21% R.H., $2.0 \times 10^{11}$ ohm/square at 30% R.H. and $2 \times 10^{10}$ ohm/square at 38% R.H.

EXAMPLE 5

This example illustrates the effect of adding both a perfluoro-terminated polyalkelene oxide surfactant and perfluorinated lithium salt $LiN(SO_2CF_3)_2$ on the antistatic properties of the cured ceramer of Example 2.

To 45 g of the 16% ceramer dispersion of Example 2 were added with vigorous agitation 2.5 g of a 16% solution of lithium di(trifluoromethanesulfone)imide $(LiN(SO_2CF_3)_2)$ and 2.5 g of a 16% solution of Zonyl™ FSN fluorosurfactant in isopropanol. The resulting dispersion was somewhat hazy, but the addition of 1.0 g deionized water rendered the dispersion crystal clear. The clarified dispersion was coated and cured on polyester sheets in exactly the same fashion as in Example 2. The average percent haze of the coated sheets was 1.3%. The coated sheets were conditioned for at least 3 hours at 30% R.H. and their charge Dissipation time and surface resistivity measured as in Test Procedures I and II. As seen in Table I, the average charge decay time of the coating dramatically dropped to 0.36 seconds at 30% R.H, while the surface resistivity significantly dropped to $3\times10^{11}$ ohm/square.

EXAMPLE 6

This example illustrates the antistatic properties of a ceramer composition containing about half the amount of acrylated silica relative to the composition in Example 3.

In a first step, a mixture consisting of 10 parts by weight N,N-dimethyl acrylamide (NNDMA), 37 parts pentaerythritol triacrylate and 2 parts Irgacure 184 was prepared. 4 g of this mixture were added to 21 g isopropanol to result in a 16% crosslinkable solution (compound A). In a second step, 22.5 g of this 16% solution were added to 0.3 g of a 16% solution of Dow Corning™ 57 surfactant in isopropanol and 0.7 g of a 16% solution of FC-122 in isopropanol (compound B). In a third step, 11.25 g of compound B were added to 11.25 g of the 16% ceramer dispersion prepared in Example 3. Note that the resulting 16% ceramer dispersion (compound C) contains about half the relative amount of acrylated silica than the 16% ceramer dispersion prepared in Example 3.

Compound C was coated and cured on polyester sheets in exactly the same fashion as in Example 2. The average percent haze of the coated sheets was 0.9%. As seen in Table I, the observed charge decay times of the coating after the required humidity conditioning dramatically dropped to 4.24 seconds at 21% R.H, 2.55 seconds at 30% R.H. and 1.6 seconds at 38% R.H. Similarly, the observed surface resistivities significantly dropped to $4\times10^{11}$ ohm/square at 21% R.H., $7\times10^{11}$ ohm/square at 30% R.H. and $3\times10^{11}$ ohm/square at 38% R.H.

EXAMPLE 7

This example illustrates the antistatic properties of a ceramer composition containing about one third the relative amount of acrylated silica than that in Example 3.

To 9.2 parts of compound B from Example 5 were added 5.6 parts of the 16% ceramer dispersion of Example 3. Note that the resulting 16% ceramer dispersion (compound D) contains about one third the relative amount of acrylated silica in the 16% ceramer dispersion prepared in Example 3.

Compound D was coated and cured on polyester sheets in exactly the same fashion as in Example 2. The average percent haze of the coated polyester sheets was 0.9%. As seen in Table I, the observed charge decay times of the coating after the required humidity conditioning dramatically dropped to 4.62 seconds at 21% R.H 2.90 seconds at 30% R.H. and 1.9 seconds at 38% R.H. Similarly, the observed surface resistivities significantly dropped to $2\times10^{12}$ ohm/square at 21% R.H., $7\times10^{11}$ ohm/square at 30% R.H. and $5\times10^{11}$ ohm/square at 38% R.H.

EXAMPLE 8

This example illustrates the effect of adding a polyalkelene oxide surfactant alone on the antistaticity of the cured ceramer of Example 2.

To 22.5 g of the 16% ceramer dispersion of Example 2 were added with vigorous agitation 0.6 g of a 16% solution of Zonyl™ FSN fluorosurfactant in isopropanol. The resulting clear dispersion was coated and cured on polyester sheets in exactly the same fashion as in Example 2. The average percent haze of the coated sheets was 1.2. As seen in Table I the observed surface resistivity of this coating was still very high at $6\times10^{13}$ ohm/square while the static decay time values remained infinite at all three conditioning humidity levels considered in this study, indicating that when the said surfactant is added alone to the ceramer composition, it has no observable effect on the static properties of the ceramer within the relative humidity range considered in this study.

EXAMPLE 9

This example illustrates the effect of added perfluorinated lithium salt $LiSO_3CF_3$ alone on the antistatic properties of the cured ceramer of Example 2.

To 22.5 g of the 16% ceramer dispersion of Example 2 were added with vigorous agitation 0.6 g of a 16% solution of lithium trifluoromethanesulfonate in isopropanol. The resulting clear dispersion was coated, cured and humidity conditioned on polyester sheets in exactly the same fashion as in Example 2. The average percent haze of the coated polyester sheets was 1.0%. As seen in Table I the observed surface resistivity of this cured composition was still in excess of $6\times10^{13}$ ohm/square while the static decay times remained infinite, indicating that the added perfluorinated lithium salt alone has a negligible effect on the static properties of the ceramer of Example 2.

EXAMPLE 10

This example illustrates the typical chemical preparation, coating and curing of a second ceramer hardcoat derived from an alkaline silica sol.

In a round-bottom glass flask I mixed with vigorous agitation 1 19 g Nalco 2327 silica sol, 12 g 3-(trimethoxysilyl)propyl methacrylate coupling agent (Dow Corning™ Z6030), 48 g 2-hydroxyethyl acrylate (Aldrich) and 48 g pentaerythritol triacrylate (Aldrich). Water was extracted using a Buchi 121 Rotavapor (Bucchi Laboratory AG, Flanil, Switzerland) at a vacuum pressure of about 90 Torr and with the water-bath temperature set at 55° C. The resulting anhydrous dispersion was crystal clear and almost water-thin. Next, 4 g of this anhydrous dispersion were added to 21 g isopropyl alcohol and 0. 16 g Irgacure 184 photoiniator to give a 16% dispersion in the solvent. This 16% dispersion was coated on polyester sheets and subsequently cured in exactly the same fashion as in Example 2. The resulting cured coating on the polyester sheets was perfectly clear to the naked eye. The observed average percent haze of the coated sheets was 1.2.

Samples of the cured coating were conditioned to 21%, 30% and 38% relative humidity and their surface resistivity measured according to Test Procedures I and II. It is seen from Table I that the surface resistivities for this example were higher than $6\times10^{12}$ ohm/square at all three humidity levels, while the charge dissipation times were in all cases infinite, indicating that the cured ceramer coating is not antistatic.

EXAMPLE 11

This example illustrates the effect of adding both a polyalkelene oxide surfactant and perfluorinated lithium salt $LiSO_3CF_3$ on the antistatic properties of the cured ceramer of Example 10.

To 22.5 g of the 16% ceramer dispersion of Example 10 were added with vigorous agitation 0.6 g of a 16% solution of lithium trifluoromethanesulfonate ($LiSO_3CF_3$) and 0.3 g of a 16% solution of Dow Corning™ 57 surfactant additive. The resulting dispersion was crystal clear and was coated and cured on polyester sheets in exactly the same fashion as in Example 2. The average percent haze of the coated construction was 1.4. As seen in Table I, the observed charge decay times of the coating after the required humidity conditioning dramatically dropped to 1.6 seconds at 21% R.H, 0.6 seconds at 30% R.H. and 0.5 seconds at 38%R.H. Similarly, the observed surface resistivities significantly dropped to $4\times10^{11}$ ohm/square at 21% R.H., $7.3\times10^{10}$ ohm/square at 30% R.H. and $5\times10^{10}$ ohm/square at 38% R.H.

EXAMPLE 12

This example illustrates the antistatic properties of a ceramer derived from an acidic silica sol and having the same organic phase as Example 10.

In a glass round-bottom flask I mixed 67.15 g Nalco™ 1042 silica sol (an acidic silica sol (34% solids) having a pH=2.8 and average particle diameter of 20 nanometers, available from Nalco Chemical Co., Chicago, Ill.), 11.2 g 2-hydroxyethyl acrylate, 5.6 g 3-(trimethoxysilyl)propyl methacrylate coupling agent, and 7.9 g pentaerythritol. Water was extracted using a Buchi 121 Rotavapor exactly as in Example 10. The resulting anhydrous dispersion was crystal clear and almost water-thin. Next, 4 g of this anhydrous dispersion were added to 21 g isopropyl alcohol and 0.14 g Irgacure 184 photoiniator to give a 16% dispersion in the solvent. This 16% dispersion was coated on polyester sheets and subsequently cured in exactly the same fashion as in Example 2. The resulting cured coating on the polyester sheets was optically clear to the naked eye. The average percent haze of the coated sheets was 1.2.

Samples of the cured coating were conditioned to 21%, 30% and 38% relative humidity and their surface resistivity measured according to Test Procedures I and II. It is seen from Table I that the surface resistivities for this example were higher than $6\times10^{13}$ ohm/square at all three humidity levels, while the charge dissipation times were infinite, indicating that the cured ceramer coating is not antistatic.

EXAMPLE 13

This example illustrates the effect of adding both a polyalkelene oxide surfactant and perfluorinated lithium salt $LiSO_3CF_3$ on the antistatic properties of the cured ceramer of Example 12.

To 22.5 g of the 16% ceramer dispersion of Example 12 were added with vigorous agitation 0.6 g of a 16% solution of lithium trifluoromethanesulfonate ($LiSO_3CF_3$) and 0.3 g of a 16% solution of Dow Corning™ 57 surfactant additive. The resulting dispersion was somewhat hazy, but the addition of 1 g deionized water rendered the dispersion crystal clear. This crystal clear dispersion was coated and cured on polyester sheets in exactly the same fashion as in Example 2. The average percent haze value of the coated sheets was 1.5.

Samples of the cured coating were conditioned to 21%, 30% and 38% relative humidity and their surface resistivity measured according to Test Procedures I and II. Surprisingly, it is seen from Table I that despite the presence of both surfactant and lithium salt in this composition at the same level as in Example 10, both the surface resistivities and charge dissipation times remained too high to qualify this ceramer as antistatic. At 21% and 30% R.H. the coatings were not antistatic, while at 38% R.H. the surface resistivity was $2\times10^{13}$ ohm/square (compared to $5\times10^{10}$ ohm/square at 38% R.H for Example 11). In addition, the charge dissipation times at 21% and 30% R.H. for this coating were infinite, while at 38% R.H. the observed charge dissipation time was 14.6 seconds (compared to 0.5 seconds for Example 11).

EXAMPLE 14

This example illustrates the typical chemical preparation, coating and curing of a ceramer hardcoat derived from an alkaline silica sol but lacking a surface treatment agent.

In a round-bottom flask I mixed 60 g Nalco 2327 alkaline silica sol and 47.6 g N,N-dimethyl acrylamide. Water was extracted using a Buchi Model 121 Rotavapor set a water-bath temperature of 60° C. and a vacuum level of 90 Torr. When all the water was extracted, 20.3 g pentaerythritol triacrylate were added to the flask to obtain a crystal clear dispersion. Next, 4 g of this dispersion were added to 21 g isopropyl alcohol and 0.16 g Irgacure photoiniator to result in a 16% dispersion in isopropanol. This 16% dispersion was coated on polyester sheets and subsequently cured in exactly the same fashion as in Example 2. The cured coatings were optically clear to the naked eye. The average percent haze of the coated sheets was 1.2%.

Samples of the cured coating were conditioned to 21%, 30% and 38% relative humidity for 3 hours. In all three cases the charge dissipation times for the coatings were infinite, and the surface resistivities exceeded $6\times10^{13}$ ohm/square.

EXAMPLE 15

This example illustrates the effect of adding both a polyalkelene oxide surfactant and perfluorinated lithium salt $LiSO_3CF_3$ on the properties of the cured ceramer of Example 14.

To 22.5 g of the 16% dispersion of Example 14 were added with vigorous agitation 0.3 g of a 16% solution of Dow Corning™ 57 surfactant additive, next, 0.6 g of a 16% solution of lithium trifluoromethanesulfonate ($LiSO_3CF_3$) were added dropwise. The resulting dispersion turned milky white and the silica sol particles precipitated out of the dispersion to form a white paste at the bottom of the flask. No amount of added deionized water caused the precipitated silica to redisperse back in the liquid phase. Coatings of this milky white dispersion on polyester film according to the procedure of Example 2 resulted in an optically unacceptable hazy coating with unacceptable rough texture. The average percent haze of the coated sheets was 16.2.

EXAMPLE 16

This example illustrates the antistatic properties of a ceramer hardcoat derived from alkaline silica sol and comprising a glycidoxy-terminated coupling agent.

In a round-bottom glass flask I mixed II 9 g Nalco 2327 silica sol, 12 g 3-glycidoxypropyltrimethoxysilane (Aldrich), 12 g N,N-dimethyl acrylamide, and 76.1 g pentaerythritol triacrylate. Water was extracted from this whittish mixture using a Buchi Rotavapor at a water-bath temperature of 55° C. The dispersion (residual liquid) turned crystal clear when all the water was extracted. This residual liquid weighed 146 g. I prepared a 16% dispersion of this ceramer in isopropanol by adding 4 g of this dispersion to 24 g isopropanol and 0.14 g Irgacure 184 photoinitiator. This 16% dispersion was coated on polyester sheets and subsequently cured in exactly the same fashion as in Example 2. The resulting cured coating on the polyester sheets was optically clear to the naked eye. The average percent haze of the coated sheets was 1.1.

Samples of the cured coating were conditioned to 21%, 30% and 38% relative humidity and their surface resistivity measured according to Test Procedures I and II. It was found that at all three humidity levels the surface resistivity exceeded $6\times10^{13}$ ohm/square, which is the upper limit of measurement of the instrument used in this study. Moreover, the observed charge dissipation times at all three humidity levels were infinite. The coating of this example was therefore judged not antistatic.

EXAMPLE 17

This example illustrates the antistatic properties of the coating of Example 16 when both polyalkelene oxide surfactant and perfluorinated lithium salt $LiSO_3CF_3$ are added to the composition.

To 22.5 g of the 16% ceramer dispersion of Example 15 were added with vigorous agitation 0.6 g of a 16% solution of lithium trifluoromethanesulfonate ($LiSO_3CF_3$) and 0.3 g of a 16% solution of Dow Corring™ 57 surfactant additive. The resulting crystal clear dispersion was coated and cured on polyester sheets in exactly the same fashion as in Example 2. The resulting cured coating on the polyester sheets was optically clear to the naked eye. The average percent haze of the coated sheets was 1.1.

Samples of the cured coating were conditioned to 21%, 30% and 38% relative humidity and their antistatic properties measured according to Test Procedures I and II. It is seen from Table I that the observed surface resistivities and charge dissipation times at all three humidity levels have dropped significantly compared to the values observed in Example 16 and are in fact almost identical to the values observed in Example 3, indicating that the presence of a surface treatment agent significantly affects the antistatic properties of a cured ceramer coating.

These examples illustrate the effect of added conventional antistatic salts on the properties of ceramer dispersions:

EXAMPLE 18

$LiBF_4$: In a glass jar I mixed 12.3 g of the 16% ceramer dispersion of Example 2 with 0.2 g lithium tetrafluoroborate $LiBF_4$ (an antistatic salt used in the prior art, such as U.S. Pat. No. 4,582,781). It was found that the $LiBF_4$ powder precipitated immediately to the bottom of the jar and remained indefinitely insoluble in the ceramer dispersion. The addition of 2 g deionized water to this inhomogeneous mixture did not cause the salt to dissolve. After 24 hours of the salt addition, the liquid phase of this inhomogeneous mixture was filtered through No. 54 Whatman filter paper and coated and cured on polyester sheets following the procedure of Example 2. The cured coating appeared to be optically clear to the naked eye. The average percent haze of the coated sheets was 1.7%.

Samples of the cured coating were conditioned to 21%, 30% and 38% relative humidity and their surface resistivity measured according to Test Procedures I and II. It was found that at all three humidity levels the surface resistivity exceeded $6 \times 10^{13}$ ohm/square, which is the upper limit of measurement of the instrument used in this study. Moreover, the charge dissipation times at all three humidity levels were infinite. The coating of this example was therefore judged not antistatic.

EXAMPLE 19

$K[C_8F_{17}SO_3]$: In a glass jar I mixed 13.7 g of the 16% ceramer dispersion of example 2 with 0.33 g of potassium perfluorinated octylsulfonate $K[C_8F_{17}SO_3]$ (available under the trade name FC95 from 3M, St. Paul, Minn.). Upon addition of this salt, the previously clear ceramer dispersion turned white and the silica precipitated out of the dispersion, forming a pasty, whitish residue at the bottom of the flask. The addition of deionized water to this inhomogeneous mixture did not cause the precipitated silica to redisperse in the milky white liquid phase. It was concluded in this experiment that $K[C_8F_{17}SO_3]$ (an antistatic salt used in the prior art, such as U.S. Pat. No. 4,582,781) is not a suitable antistatic additive for the ceramer composition of this invention as it caused it to loose its chemical stability.

EXAMPLE 20

$LiCO_2CH_3$: In a glass flask I mixed 13.5 g of the 16% ceramer dispersion of Example 2 and 0.25 g lithium acetate (Aldrich) and 2 g deionized water. After a 48 hour period, the lithium acetate powder dissolved completely in the ceramer dispersion which remained optically clear. Aliquots of this dispersion were coated on polyester sheets using a #9 Myer rod as described in the coating procedure of Example 2. However, when the wet coatings were dried in the forced air oven at 60° C., a white precipitate formed in the coating and resulted in an unacceptable granular pattern on the polyester substrate indicative of the flocculation of the silica. It was concluded in this experiment that lithium acetate is not a suitable antistatic additive for the ceramer composition of this invention.

EXAMPLE 21

$NaSO_4(CH_2)_{11}CH_3$: In a glass flask containing 22.5 g of the 16% ceramer 15 dispersion of Example 2, I added dropwise 0.6 g of a 16% solution of sodium lauryl sulfate salt in deionized water. Addition of the aqueous sodium lauryl sulfate salt, however, caused instant flocculation of the silica and its precipitation to the bottom of the holding flask where it formed an intractable paste. Subsequent coating of this inhomogeneous mixture on polyester resulted in a whitish inhomogeneous film. It was concluded in this experiment that sodium lauryl sulfate is not a suitable antistatic additive for the ceramer composition of this invention.

EXAMPLE 22

This example illustrates the antistatic properties of a ceramer wherein the curable organic phase is derived from an organofunctional silane monomer.

In glass flask containing 25 g Nalco 2327 silica sol I added dropwise and with vigorous mixing, 21 g methyl triethoxysilane (Aldrich). The mixture turned completely homogeneous and transparent after 48 hours of mixing at 23° C. To this homogeneous dispersion I added 0.5 g $LiN(SO_2CF_3)_2$ and 0.8 g of a 50% solution of Zonyl™ FSN surfactant in isopropanol. The resulting mixture remained perfectly clear. Next, samples of this mixture were coated on polyester sheets using a #9 Myer rod and the coated sheets placed in a forced air oven at 99° C. for 20 minutes. The resultant hardcoat was transparent, reading 1.1% haze at 23° C. The hardcoated sheets were conditioned for 3 hours at 30% and 38% relative humidity and their antistatic property measured as in Test Procedures I and II. As shown in Table I, the coatings exhibited excellent surface resistivity and charge dissipation times under both conditions.

TABLE I

| | $\rho_s$ ($\Omega/cm^2$) | | | CDT(sec.) | | | | |
|---|---|---|---|---|---|---|---|---|
| Example | 21% | 30% | 38% | 21% | 30% | 38% | Haze(%) | Note |
| 1 | $>6 \times 10^{13}$ | $>6 \times 10^{13}$ | $>6 \times 10^{13}$ | ∞ | ∞ | ∞ | 0.3 | bare PET |
| 2 | $>6 \times 10^{13}$ | $>6 \times 10^{13}$ | $>6 \times 10^{13}$ | ∞ | ∞ | ∞ | 0.7 | Control |
| 3 | $4 \times 10^{11}$ | $1.9 \times 10^{11}$ | $6 \times 10^{10}$ | 1.54 | 0.8 | 0.6 | 1.4 | Invention |

TABLE I-continued

| | $\rho_s$ ($\Omega/cm^2$) | | | CDT(sec.) | | | | |
|---|---|---|---|---|---|---|---|---|
| Example | 21% | 30% | 38% | 21% | 30% | 38% | Haze(%) | Note |
| 4 | $7 \times 10^{11}$ | $2 \times 10^{11}$ | $2 \times 10^{10}$ | 2.3 | 0.9 | 0.6 | 1.3 | Invention |
| 5 | — | $3 \times 10^{11}$ | $1.8 \times 10^{10*}$ | — | 0.4 | 0.2* | 1.3 | Invention |
| 6 | $4 \times 10^{11}$ | $7 \times 10^{11}$ | $3 \times 10^{11}$ | 4.24 | 2.55 | 1.6 | 0.9 | Invention |
| 7 | $2 \times 10^{12}$ | $7 \times 10^{11}$ | $5 \times 10^{11}$ | 4.62 | 2.90 | 1.9 | 0.9 | Invention |
| 8 | $>6 \times 10^{13}$ | $>6 \times 10^{13}$ | $>6 \times 10^{13}$ | $\infty$ | $\infty$ | $\infty$ | 1.2 | Control |
| 9 | $>6 \times 10^{13}$ | $>6 \times 10^{13}$ | $>6 \times 10^{13}$ | $\infty$ | $\infty$ | $\infty$ | 1.0 | Control |
| 10 | $>6 \times 10^{13}$ | $>6 \times 10^{13}$ | $>6 \times 10^{13}$ | $\infty$ | $\infty$ | $\infty$ | 1.2 | Control |
| 11 | $4 \times 10^{11}$ | $7.3 \times 10^{10}$ | $5.0 \times 10^{10}$ | 1.6 | 0.6 | 0.5 | 1.4 | Invention |
| 12 | $>6 \times 10^{13}$ | $>6 \times 10^{13}$ | $>6 \times 10^{13}$ | $\infty$ | $\infty$ | $\infty$ | 1.2 | Control |
| 13 | $>6 \times 10^{13}$ | $>6 \times 10^{13}$ | $2 \times 10^{1.3}$ | $\infty$ | $\infty$ | 14.6 | 1.5 | Control |
| 14 | $>6 \times 10^{13}$ | $>6 \times 10^{13}$ | $>6 \times 10^{13}$ | $\infty$ | $\infty$ | $\infty$ | 1.2 | Control |
| 15 | N/A** | N/A | N/A | N/A | N/A | N/A | 16.2 | Control |
| 16 | $>6 \times 10^{13}$ | $>6 \times 10^{13}$ | $>6 \times 10^{13}$ | $\infty$ | $\infty$ | $\infty$ | 1.1 | Control |
| 17 | $5.8 \times 10^{11}$ | $1.9 \times 10^{11}$ | $6 \times 10^{10}$ | 1.54 | 0.8 | 0.6 | 1.1 | Invention |
| 18 | $>6 \times 10^{13}$ | $>6 \times 10^{13}$ | $>6 \times 10^{13}$ | $\infty$ | $\infty$ | $\infty$ | 1.7 | Control |
| 19 | N/A | N/A | N/A | N/A | N/A | N/A | N/A | Control |
| 20 | N/A | N/A | N/A | N/A | N/A | N/A | N/A | Control |
| 21 | N/A | N/A | N/A | N/A | N/A | N/A | N/A | Control |
| 22 | — | $6 \times 10^{11}$ | $4 \times 10^{11}$ | — | 2.6 | 1.8 | 1.1 | Invention |

*Readings taken at 51%R.H. and 23° C.
**N/A (Not Applicable) refers to experimental examples where the addition of antistatic salt and/or surfactant led to the flocculation and precipitation of the silica particles from the previously stable dispersion.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A cured, antistatic, ceramer coating, comprising:
   (a) a polymeric matrix;
   (b) a plurality of surface treated, colloidal inorganic oxide particles interspersed in the matrix, wherein the colloidal inorganic oxide particles have a negative surface charge and wherein the colloidal inorganic oxide particles comprise silica particles that are derived from a sol having a pH greater than 7;
   (c) an antistatic amount of an antistatic agent dispersed in the polymeric matrix, wherein the antistatic agent comprises a perfluorinated anion having at least one perfluorinated moiety; and
   (d) an amount of a nonionic surfactant effective to bias the perfluorinated moiety to migrate to a surface of the polymeric matrix.

2. The antistatic coating of claim 1, wherein the composition comprises 100 parts by weight of the polymeric matrix, 10 to 50 parts by weight of the surface treated, colloidal, inorganic oxide particles, 0.1 to 10 parts by weight of the antistatic agent, and 0.1 to 10 parts by weight of the nonionic surfactant.

3. The antistatic coating of claim 2, wherein the surface treated, colloidal, inorganic oxide particles comprise surface treated, colloidal silica.

4. The antistatic coating of claim 2, wherein the composition further comprises a cation corresponding to the negatively surface charged inorganic oxide particles, wherein the cation is a quaternary ammonium cation.

5. The antistatic coating of claim 4, wherein the quaternary ammonium cation is $NH_4^+$.

6. The antistatic coating of claim 2, wherein the polymeric matrix is derived from a curable binder component comprising a plurality of free radically curable monomers having an average free radically curable functionality in the range from 1.5 to 3.

7. The antistatic coating of claim 2, wherein the polymeric matrix is derived from a curable binder component comprising one or more organofunctional silane monomers.

8. The antistatic coating of claim 6, wherein said plurality of free radically curable monomers comprises an N,N-disubstituted (meth)acrylamide monomer and at least one multifunctional (meth)acrylate monomer.

9. The antistatic coating of claim 8, where the N,N-disubstituted (meth)acrylamide monomer has the formula:

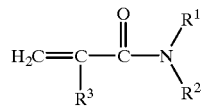

wherein $R^1$ and $R^2$ are each independently selected from hydrogen, an alkyl group optionally having hydroxy, halide, carbonyl, or amido functionalities, an alkylene group optionally having carbonyl and amido functionalities, an alkoxy group, an aryl group, an alkaryl group, and a heteroaryl group; with the proviso that only one of $R^1$ and $R^2$ is hydrogen; and $R^3$ is hydrogen, or an alkyl group of 1 to 4 carbon atoms.

10. The antistatic coating of claim 6, wherein the colloidal inorganic oxide particles are surface treated with a coupling agent comprising a first moiety reactive with the colloidal inorganic oxide particles and a second, radiation curable moiety copolymerizable with the free radically curable monomers.

11. The antistatic coating of claim 10, wherein the colloidal inorganic oxide particles comprise silica, and the first reactive moiety is a silane moiety.

12. The antistatic coating of claim 2, wherein each perfluorinated moiety of the perfluorinated anion comprises no more than 4 carbon atoms.

13. The antistatic composition of claim 2, wherein the perfluorinated anion has the formula:

$$R_f\text{—}X\text{—}SO_2^-$$

wherein $R_f$ is a perfluorinated group of 1 to 4 carbon atoms.

14. The antistatic coating of claim 13, wherein the coating further comprises a $Li^+$ countercation corresponding to the anion.

15. The antistatic coating of claim 13, wherein $R_f$ is $-CF_3$.

16. The antistatic coating of claim 2, wherein the antistatic agent is a methide salt of the formula:

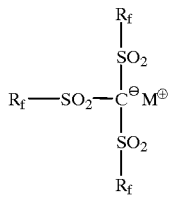

wherein each $R_f$ is independently a perfluorinated moiety of 1 to 4 carbon atoms; and $M^+$ is selected from the group consisting of $Na^+$, $Li^+$, quaternary ammonium, $K^+$, and combinations thereof.

17. The antistatic coating of claim 16, wherein the methide salt has the formula:

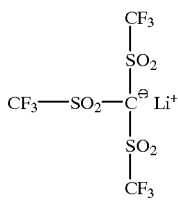

18. The antistatic coating of claim 2, wherein the antistatic agent is a methide salt of the formula:

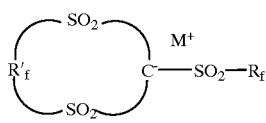

wherein $R_f$ is a monovalent perfluorinated moiety of 1 to 4 carbon atoms; $R'_f$ is a divalent perfluorinated moiety; and $M^+$ is selected from the group consisting of $Na^+$, $Li^+$, quaternary ammonium, $K^+$, and combinations thereof.

19. The antistatic coating of claim 18, wherein $M^+$ is $Li^+$, $R_f$ is $-CF_3$, and $R'_f$ is $-CF_2CF_2-$.

20. The antistatic coating of claim 2, wherein the antistatic agent is an imide salt of the formula:

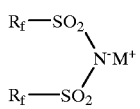

wherein each $R_f$ is independently a perfluoro moiety of 1 to 4 carbon atoms; and $M^+$ is selected from the group consisting of $Na^+$, $Li^+$, quaternary ammonium, $K^+$, and combinations thereof.

21. The antistatic coating of claim 20, wherein each $R_f$ is selected from $-CF_3$ and $-C_2F_5$.

22. The antistatic coating of claim 20, wherein $M^+$ is $Li^+$.

23. The antistatic coating of claim 2, wherein the antistatic agent is a methide salt of the formula:

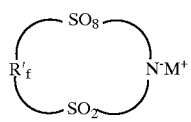

wherein $R'_f$ is a divalent perfluorinated moiety of 1 to 4 carbon atoms; and $M^+$ is selected from the group consisting of $Na^+$, $Li^+$, quaternary ammonium, $K^+$, and combinations thereof.

24. The antistatic coating of claim 23, wherein $R'_f$ is selected from $-CF_2CF_2-$ and $-CF_2CF_2CF_2-$.

25. The antistatic coating of claim 23, wherein $M^+$ is $Li^+$.

26. The antistatic coating of claim 7, wherein the nonionic surfactant comprises a polyalkylene oxide moiety and a surface active moiety substantially insoluble in the free radically curable monomers.

27. The antistatic coating of claim 26, wherein the insoluble surface active moiety is selected from a perfluorinated moiety, a hydrocarbon moiety, and a polysiloxane moiety.

28. A composite structure, comprising
   (a) a polymeric substrate having a coatable surface;
   (b) an antistatic ceramer coating provided on the coatable surface, wherein the coating comprises
      (i) a polymeric matrix;
      (ii) a plurality of surface treated, colloidal inorganic oxide particles interspersed in the matrix, wherein the colloidal inorganic oxide particles have a negative surface charge and wherein the colloidal inorganic oxide particles comprise silica particles that are derived from a sol having a pH greater than 7;
      (iii) an antistatic amount of an antistatic agent dispersed in the polymeric matrix, wherein the antistatic agent comprises a perfluorinated anion having at least one perfluorinated moiety; and
      (iv) an amount of a nonionic surfactant effective to bias the perfluorinated moiety to migrate to a surface of the polymeric matrix.

29. The composite structure of claim 28, wherein the composition comprises 100 parts by weight of the polymeric matrix, 10 to 50 parts by weight of the surface treated, colloidal, inorganic oxide particles, 0.1 to 10 parts by weight of the antistatic agent, and 0.1 to 10 parts by weight of the nonionic surfactant.

30. The composite structure of claim 29, wherein the surface treated, colloidal, inorganic oxide particles comprise surface treated, colloidal silica.

31. The composite structure of claim 29, wherein the composition further comprises a cation corresponding to the negatively surface charged inorganic oxide particles, wherein the cation is a quaternary ammonium cation.

32. The composite structure of claim 31, wherein the quaternary ammonium cation is $NH_4^+$.

33. The composite structure of claim 29, wherein each perfluorinated moiety of the perfluorinated anion comprises no more than 4 carbon atoms.

* * * * *

UNITED STATES PATENT AND TRADEMARK OFFICE
CERTIFICATE OF CORRECTION

PATENT NO. : 6,358,601 B1
DATED : March 19, 2002
INVENTOR(S) : Taniguchi et al.

It is certified that error appears in the above-identified patent and that said Letters Patent is hereby corrected as shown below:

Column 6,
Line 45, please change "yam" to -- yarn --.

Signed and Sealed this

Eighteenth Day of June, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,358,601 B1
DATED : March 19, 2002
INVENTOR(S) : Zayn Bilkadi

It is certified that error appears in the above-identified patent and that said Letters Patent is hereby corrected as shown below:

This certificate supersedes Certificate of Correction issued June 18, 2002, the number was erroneously mentioned and should be deleted since no certificate of correction was granted.

Signed and Sealed this

Tenth Day of September, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.    : 6,358,601 B1
DATED         : March 19, 2002
INVENTOR(S)   : Zayn Bilkadi It is certified that error appears in the above-identified patent and that said Letters Patent is hereby corrected as shown below:

This certificate supersedes Certificate of Correction issued June 18, 2002, the number was erroneously mentioned and should be deleted since no certificate of correction was granted.

Signed and Sealed this

Eighth Day of October, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,358,601 B1
DATED : March 19, 2002
INVENTOR(S) : Zayn Bilkadi

It is certified that error appears in the above-identified patent and that said Letters Patent is hereby corrected as shown below:

Column 9,
Lines 6 and 41, insert -- . -- following "thereof".

Column 10,
Line 66, delete "Theological" and insert in place thereof -- rheological --.

Column 15,
Lines 11 and 12, insert -- $C_{12}H_{23}$-O-$(CH_2$-$CH_2$-O$)_{10}$-H --.
Lines 11 and 12, insert -- $C_8H_{17}$-O-$(CH_2$-$CH_2$-O$)_7$-H --.

Column 16,
Line 32, delete "Corring" and insert in place thereof -- Corning --.

Column 21,
Line 32, delete "Procedure II" and insert in place thereof -- Procedure III --.

Column 22,
Line 22, delete "Corring$^{TM}$" and insert in place thereof -- Corning$^{TM}$ --.

Column 27,
Line 31, delete "LiBF4" and insert in place thereof -- $LiBF_4$ --.

Signed and Sealed this

Twentieth Day of January, 2004

JON W. DUDAS
*Acting Director of the United States Patent and Trademark Office*